US008699083B2

(12) United States Patent
Okada et al.

(10) Patent No.: US 8,699,083 B2
(45) Date of Patent: Apr. 15, 2014

(54) IMAGE PROCESSING DEVICE, IMAGE FORMING DEVICE, AND COMPUTER-READABLE MEDIUM

(75) Inventors: Keiichi Okada, Kanagawa (JP); Kaoru Yamauchi, Kanagawa (JP); Noribumi Sato, Kanagawa (JP); Mitsuru Iioka, Kanagawa (JP); Jun Koyatsu, Kanagawa (JP); Hatsuho Ajima, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 517 days.

(21) Appl. No.: 12/967,137

(22) Filed: Dec. 14, 2010

(65) Prior Publication Data

US 2011/0310440 A1 Dec. 22, 2011

(30) Foreign Application Priority Data

Jun. 22, 2010 (JP) ................ 2010-141435

(51) Int. Cl.
*G06T 5/00* (2006.01)
*G06T 15/02* (2011.01)

(52) U.S. Cl.
USPC ........... 358/3.26; 358/1.9; 358/462; 358/496; 358/497; 358/498; 382/173; 382/152

(58) Field of Classification Search
USPC .......... 358/3.26, 1.9, 462, 496–498; 382/173, 382/152
See application file for complete search history.

(56) References Cited

U.S. PATENT DOCUMENTS

| 4,163,605 | A | 8/1979 | Yamada |
| 5,001,575 | A | 3/1991 | Nakahara |
| 7,898,695 | B1 * | 3/2011 | Damon et al. ............. 358/3.26 |
| 2003/0174364 | A1 | 9/2003 | Goto |
| 2007/0139715 | A1 | 6/2007 | Kazama et al. |
| 2008/0089585 | A1 * | 4/2008 | Yashima et al. ............. 382/173 |

FOREIGN PATENT DOCUMENTS

| JP | 53-11601 A | 2/1978 |
| JP | 2-137473 A | 5/1990 |
| JP | 2003-274143 A | 9/2003 |
| JP | 2006-020181 A | 1/2006 |
| JP | 2006-270149 A | 10/2006 |
| JP | 2007-174060 A | 7/2007 |
| JP | 2008-099114 A | 4/2008 |

* cited by examiner

*Primary Examiner* — Quang N Vo
(74) *Attorney, Agent, or Firm* — Sughrue Mion, PLLC

(57) ABSTRACT

An image processing device includes a screen processing unit and a correction processing unit. The screen processing unit executes screen processing for an image to be processed. The correction processing unit performs correction processing of correcting a distortion of an output image from an original image, based on the amount of the distortion, for (i) the image before the screen processing and (ii) the image after the screen processing. The correction amount relating to the correction processing for the image after the screen processing is a small value as compared with the correction amount relating to the correction processing for the image before the screen processing.

6 Claims, 23 Drawing Sheets

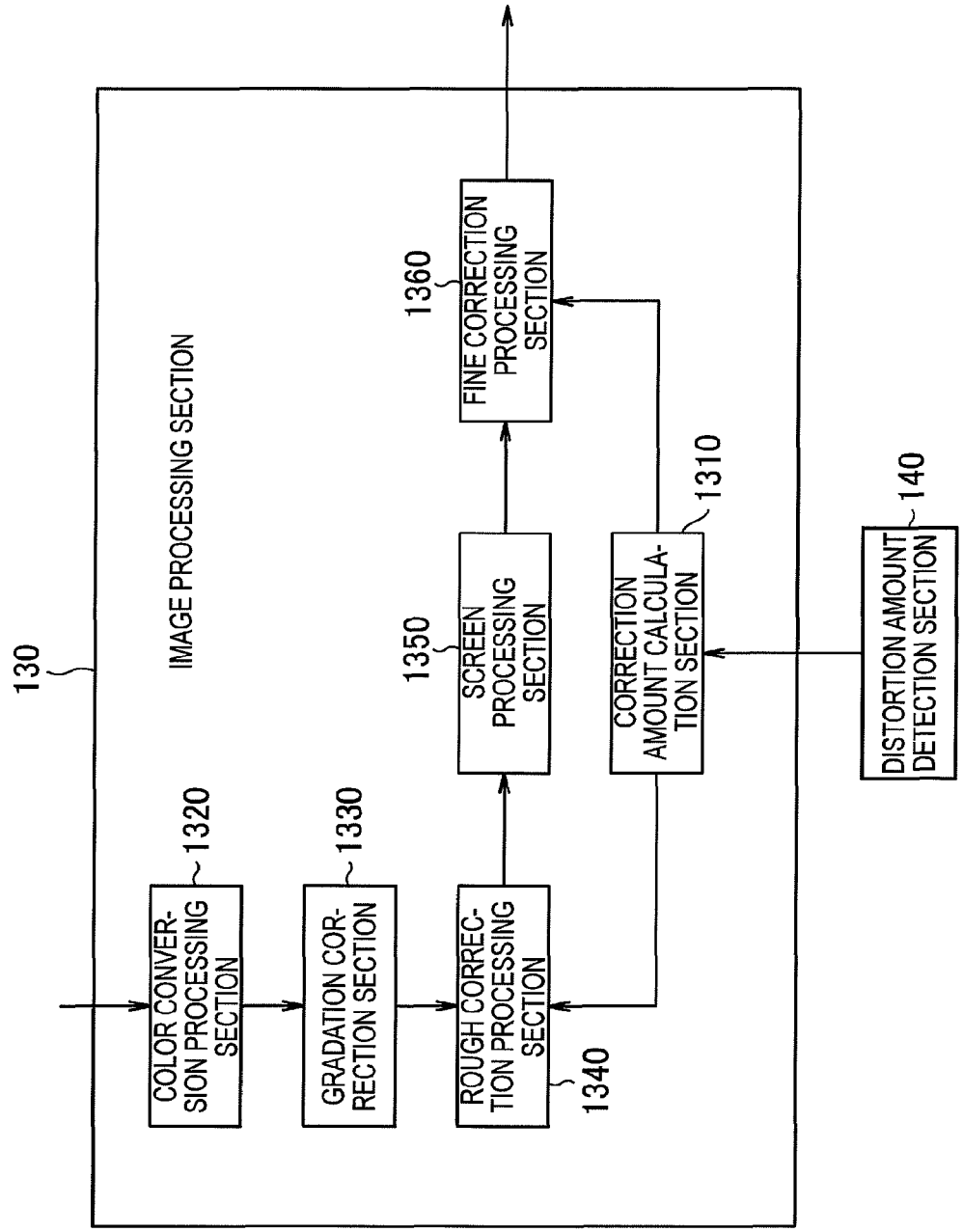

ORIGINAL IMAGE

MAIN SCANNING DIRECTION

SUBSCANNING DIRECTION

OUTPUT IMAGE (MAIN SCANNING DIRECTION MAGNIFICATION BALANCE DISTORTION, DIMENSION DISTORTION)

SHIFT AMOUNT S

DRAWING RANGE IN MAIN SCANNING DIRECTION WHEN DISTORTION EXISTS

ACCURATE DRAWING RANGE IN MAIN SCANNING DIRECTION WHEN DISTORTION DOES NOT EXIST

EXAMPLE OF CORRECTION IMAGE WHEN PIXEL INSERTION (SIMPLE INSERTION) IS EXECUTED

3-PIXEL EXPANSION

EXAMPLE OF CORRECTION IMAGE WHEN PIXEL INSERTION (IMAGE INSERTION INTO OFFSET POSITION) IS EXECUTED

3-PIXEL EXPANSION

FIG. 7D
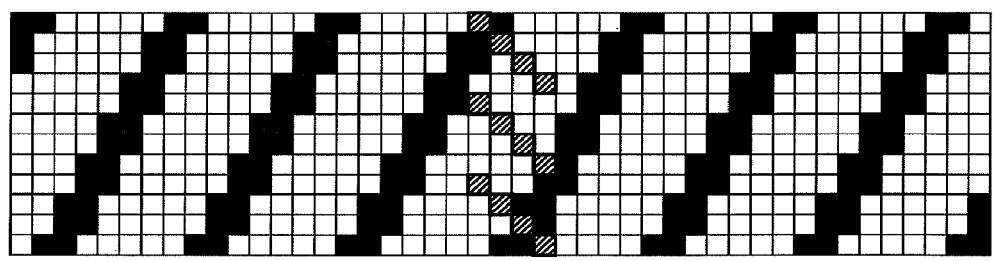
FIG. 7E
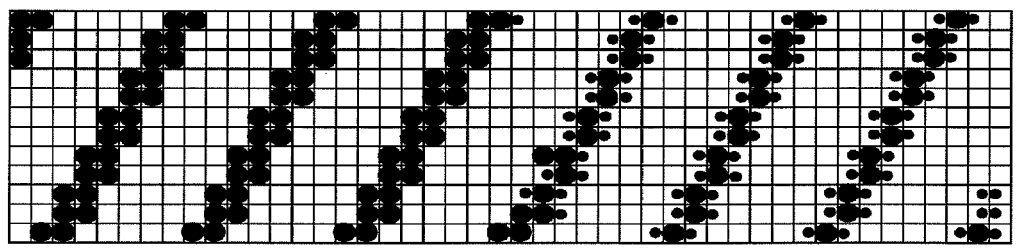
IN FIG. 7D, ▨ INDICATES INSERTION POSITION

ORIGINAL IMAGE

RESULT OF ROUGH CORRECTION (5-PIXEL
INSERTION) BEFORE SCREEN PROCESSING

5-PIXEL
EXPANSION

DETERMINATION RESULT OF INSERTION POSITIONS TO
MAKE FINE ADJUSTMENT AFTER SCREEN PROCESSING

D1, D2, AND D3 INSERTION POSITIONS ARE POSITIONS OF BLACK PIXELS

RESULT OF FINE ADJUSTMENT (1/2 PIXEL INSERTION) WITH PWM OR PAM

● DRAWING BASED ON PWM SIGNAL WITH PULSE WIDTH OF 100%

• DRAWING BASED ON PWM SIGNAL WITH PULSE WIDTH OF 50%

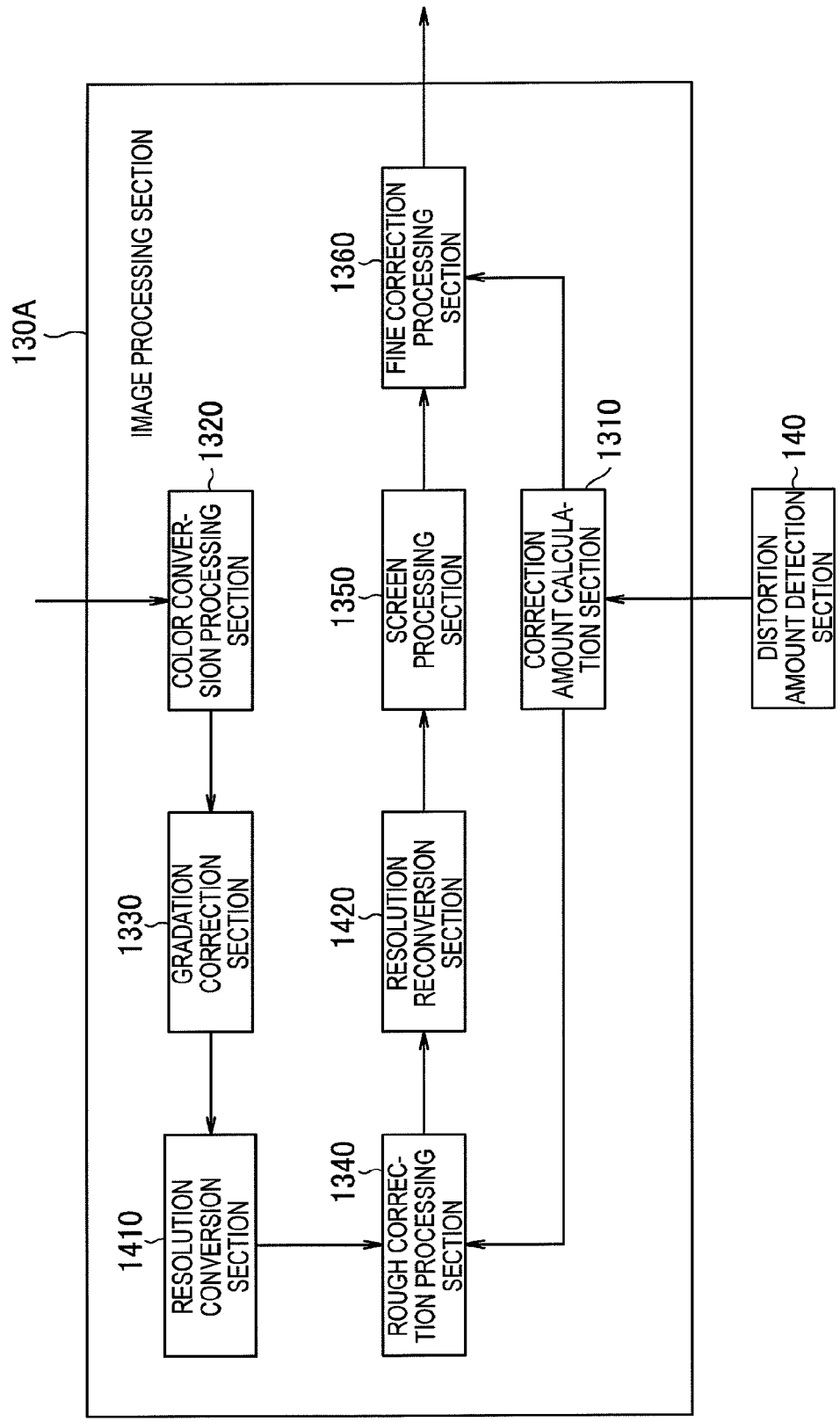

ORIGINAL IMAGE

RESULT OF RESOLUTION
CONVERSION
(600 DPI TO 120 DPI)

RESULT OF ROUGH
CORRECTION BEFORE
SCREEN PROCESSING
(FOUR-PIXEL INSERTION
IN TERMS OF 1200 DPI)

RESULT OF PERFORMING
SCREEN PROCESSING FOR
ROUGHLY CORRECTED IMAGE

RESULT OF DETERMINING
INSERTION POSITIONS TO
MAKE FINE CORRECTION
AFTER SCREEN PROCESSING

▨ INDICATES INSERTION
POSITION

RESULT OF FINE CORREC-
TION WITH PWM OR PAM
(1/4 PIXEL INSERTION IN
TERMS OF 600 DPI)

4-PIXEL EXPANSION

IN FIG. 16D, ▨ INDICATES INSERTION POSITION

IMAGE PROCESSING DEVICE, IMAGE FORMING DEVICE, AND COMPUTER-READABLE MEDIUM

CROSS-REFERENCE TO RELATED APPLICATION

This application is based on and claims priority under 35 USC119 from Japanese Patent Application No. 2010-141435 filed on Jun. 22, 2010.

BACKGROUND

1. Technical Field

This invention relates to an image processing device, an image forming device, and a computer-readable medium.

2. Related Art

To reproduce gradation (for example, halftone, etc.,), an electrophotographic image forming device performs screen processing for an original image by means for performing screen processing and forms an image (electrostatic latent image) on an image hold body by optical scanning based on a signal (pulse signal) corresponding to the image after subjected to the screen processing.

The dimensions of the original image and the dimensions of an output image (an image formed on a record medium such as a record sheet) may distort because of an alignment error of an optical system containing a component for forming the electrostatic latent image, an exposure device or the image hold body (an error of the actual attachment position of the optical system or the image hold body relative to a predetermined attachment position), for example.

Thus, in the image forming device described above, to correct the distortion, a pixel is inserted into or is thinned out (deleted) from the image after subjected to the screen processing in response to the screen characteristic.

SUMMARY

According to an aspect of the invention, an image processing device includes a screen processing unit and a correction processing unit. The screen processing unit executes screen processing for an image to be processed. The correction processing unit performs correction processing of correcting a distortion of an output image from an original image, based on the amount of the distortion, for (i) the image before the screen processing and (ii) the image after the screen processing. The correction amount relating to the correction processing for the image after the screen processing is a small value as compared with the correction amount relating to the correction processing for the image before the screen processing.

BRIEF DESCRIPTION OF THE DRAWINGS

Exemplary embodiments of the invention will be described in detail based on the following figures, wherein:

FIG. 3 is a block diagram to show the function configuration of an image processing section of an image processing device according to the first embodiment of the invention;

FIGS. 7A to 7E are drawings to describe the distortion correction processing according to the first embodiment of the invention;

FIG. 11 is a block diagram to show the function configuration of an image processing section of an image processing device according to a second embodiment of the invention;

DETAILED DESCRIPTION

Figure 1:
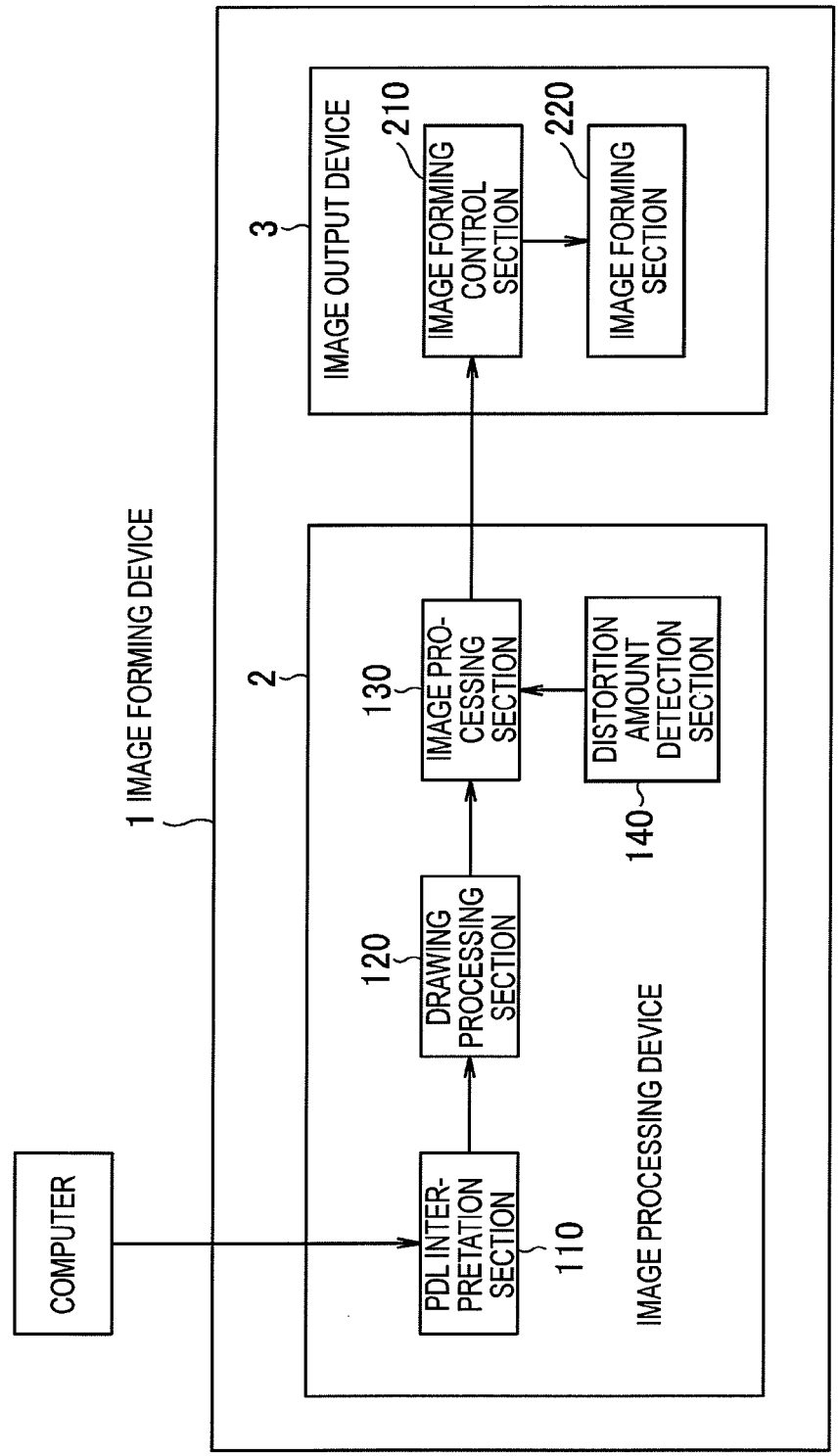
FIG. 1 is a block diagram to show the function configuration of an image forming device according to a first embodiment of the invention.

Embodiments of the invention will be discussed below in detail based on the accompanying drawings: In the drawings to describe the embodiments, identical components are denoted by the same reference numerals as a rule and will not be discussed again.

An image forming apparatus according to a first embodiment of the invention will be discussed with reference to FIG. 1.

As shown in FIG. 1, an image forming apparatus 1 has an image processing device 2 for performing image processing for image data of an image forming target (print target) and an image output device 3 for performing image forming processing based on image data (image data or page data) output from the image processing device 2.

The image processing device 2 has a PDL interpretation section 110, a drawing processing section 120, an image processing section 130, and a distortion amount detection section 140.

The image processing device 2 receives print data to be printed (original data) transmitted from a computer, for example, data described in page description language (which will be hereinafter called "PDL data").

The PDL interpretation section 110 interprets the received PDL data and outputs the interpretation result to the drawing processing section 120.

The drawing processing section 120 expands vector data (image data) contained in the PDL data to RGB rasterize data (raster image or bit map data) in page units based on the interpretation result from the PDL interpretation section 110.

Although described later in detail, the image processing section 130 performs image processing of color conversion processing, gradation correction processing, screen processing (dot generation processing), correction processing of correcting distortion based on the distortion amount (amount of distortion of output image from original image), and the like and outputs the image data after subjected to the image processing to an image forming control section 210 of the image output device 3.

The distortion amount detection section 140 detects a distortion of the output image (image formed on a print medium) from the original image and outputs the detection result (distortion amount) to the image processing section 130. For example, a distortion of the dimensions of the output image from the dimensions of the original image is detected. Of course, in addition to the distortion of the dimensions, if a distortion caused by inclination, bend, etc., of an image occurs, the distortion amount is detected by the distortion amount detection section 140.

Figure 2:
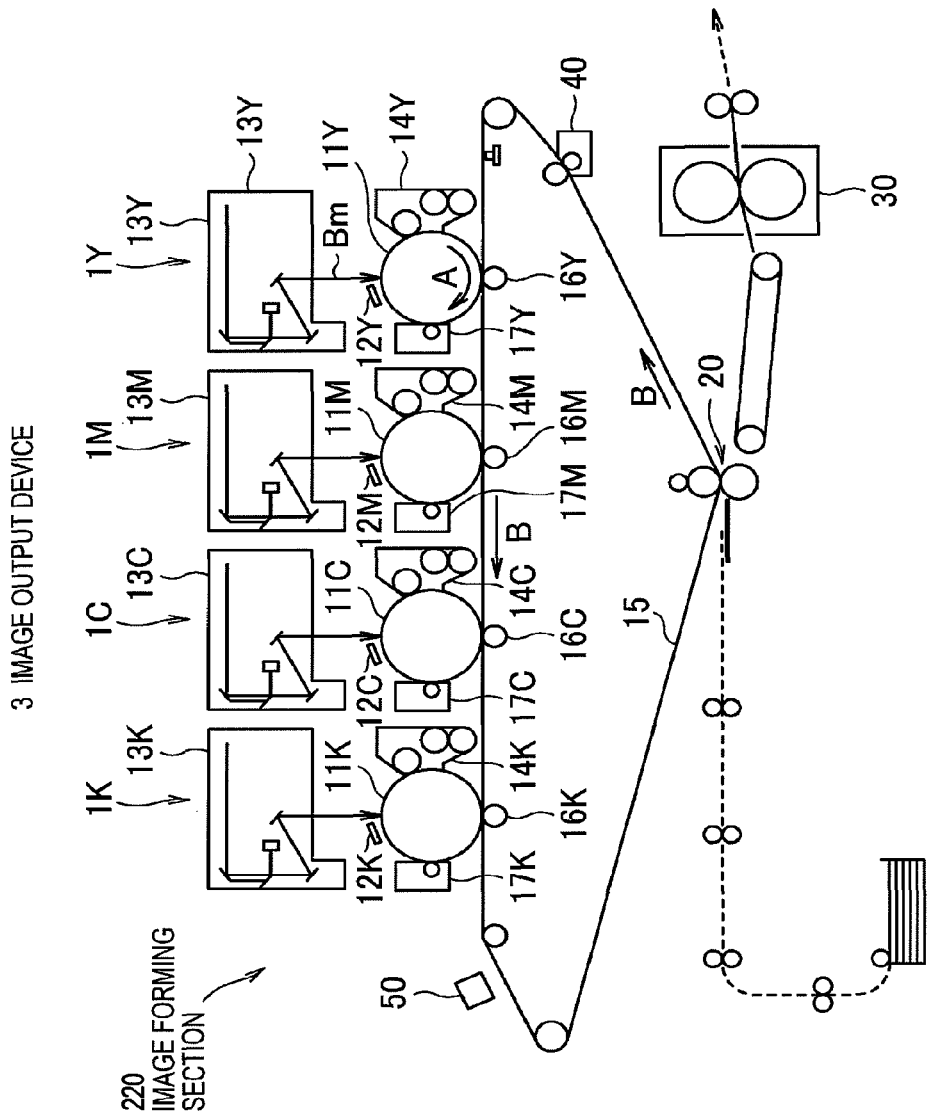
FIG. 2 is a configuration drawing to show the configuration of an image forming section of an image output device according to the first embodiment of the invention.

In this connection, the distortion amount detection section 140 makes a comparison between image data (output image data) of a test pattern based on the detection result from a sensor 50 (see FIG. 2) for detecting the test pattern (or image to be detected) formed on an intermediate transfer belt 15 (see FIG. 2) of an image forming section 220 described later, for example, namely, a toner image and original image data of the test pattern, thereby detecting a distortion of the output image from the original image.

The distortion amount detection section 140 may make a comparison between the read result (output image data) of printed matter as a result of actual image forming output of a test pattern image through an image reader (not shown) connected to the image processing device 2 and original image data of the test pattern, thereby detecting a distortion of the output image from the original image.

The image output device is a tandem image output device of intermediate transfer system and has the image forming control section 210 and the image forming section 220.

The image forming control section 210 controls the whole image output device 3 and controls image forming processing, namely, the whole electrophotographic process for image data (image data or page data) output from the image processing device, for example.

The image forming section 220 executes image forming processing based on the image data output from the image processing device 2 under the control of the image forming control section 210 and outputs printed matter (sheet on which a color image is printed) as the result of the image forming processing.

The image output device 3 draws an image with a predetermined drawing resolution of 1200 dpi, 2400 dpi, 4800 dpi, etc.

In the image output device 3, the image forming section 220 includes a plurality of image forming units 1Y, 1M, 1C, and 1K for forming toner images of color components of yellow (Y), magenta (M), cyan (C), and black (K) by an electrophotographic system and primary transfer rolls 16Y, 16M, 16C, and 16K as primary transfer sections for sequentially transferring (primarily transferring) the toner images of color components formed by the image forming units 1Y, 1M, 1C, and 1K to the intermediate transfer belt 15 for circulating (rotating) in an arrow B direction in the figure.

The image forming section 220 also includes a secondary transfer section 20 for collectively transferring (secondarily transferring) toner images (superposed toner images) transferred onto the intermediate transfer belt 15 to a sheet, for example, as a record medium and a fixing device 30 for fixing the toner images on the sheet by heating and pressurizing the sheet to which the toner images are transferred. The sheet subjected to such fixing processing is output toward a sheet storage section (not shown).

A cleaner 40 for removing the remaining toner on the intermediate transfer belt 15 for circulating (rotating) in the arrow B direction in the figure is placed downstream in the arrow B direction from the secondary transfer section 20.

By the way, the image forming units 1Y, 1M, 1C, and 1K have photoconductive drums 11Y, 11M, 11C, and 11K rotating in an arrow A direction in the figure respectively.

The photoconductive drum 11 (11Y, 11M, 11C, 11K) is surrounded in sequence by electrophotographic devices such as charger 12Y, 12M, 12C, 12K for charging the photoconductive drum 11 along the rotation direction, laser exposure device 13Y, 13M, 13C, and 13K for writing an electrostatic latent image onto the photoconductive drum 11 (in the figure, an exposure beam is denoted by a sign Bm), developing device 14Y, 14M, 14C, 14K in which the corresponding color component toner is stored for visualizing the electrostatic latent image on the photoconductive drum 11 in the toner, primary transfer roll 16Y, 16M, 16C, 16K for transferring the toner image of the color component formed on the photoconductive drum 11 to the intermediate transfer belt 15, and drum cleaner 17Y, 17M, 17C, 17K for removing the remaining toner on the photoconductive drum 11.

The laser exposure devices 13Y, 13M, 13C, and 13K expose with predetermined drawing resolution of 1200 dpi, 2400 dpi, 4800 dpi, etc.

The image forming units 1Y, 1M, 1C, and 1K are placed roughly linearly in the order of yellow (Y), magenta (M), cyan (C), and black (K) from the upstream side in the rotation direction of the intermediate transfer belt 15 (arrow B direction in the figure). The photoconductive drums 11Y, 11M, 11C, and 11K can be brought into and out of contact with the intermediate transfer belt 15.

The sensor 50 for detecting a test pattern (or an image to be detected) formed on the intermediate transfer belt 15 namely, a toner image is provided downstream in the rotation direction of the intermediate transfer belt 15 from the image forming unit 1K. The detection result of the sensor 50 is output to the distortion amount detection section 140 of the image processing device 2 as an output image.

Next, in the image processing device 2, the image processing section 130 includes a correction amount calculation section 1310, a color conversion processing section 1320, a gradation correction section 1330, a rough correction processing section 1340, a screen processing section 1350, and a fine correction processing section 1360.

The correction amount calculation section 1310 calculates a correction amount for correcting distortion of the output image from the original image based on the distortion amount given from the distortion amount detection section 140.

That is, the correction amount calculation section 1310 calculates a first correction amount (rough correction amount) relating to the correction processing to the image before the screen processing and a second correction amount (fine correction amount) relating to the correction processing to the image after the screen processing, outputs the first correction amount to the rough correction processing section 1340, and outputs the second correction amount to the fine correction processing section 1360.

Figure 4A:
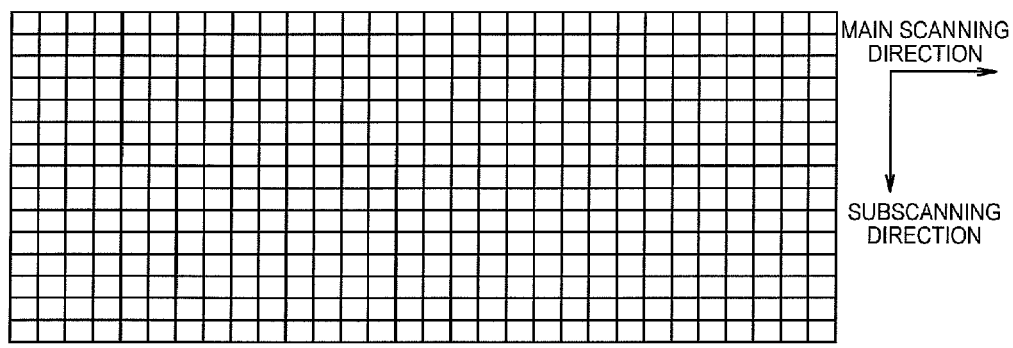
FIGS. 4A and 4B are conceptual drawings to show states in which the dimensions in a main scanning direction distort according to the first embodiment of the invention.
Figure 4B:
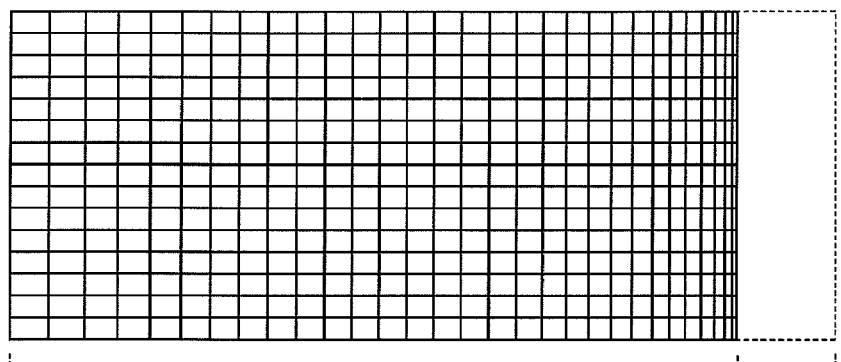

For example, it is assumed that a main scanning direction magnification balance distortion (dimension distortion) occurs as shown in FIG. 4B in an output image for an original image shown in FIG. 4A. In this case, the output image is short in the length in the main scanning direction as compared with the original image and thus the amount of the distortion of the output image from the original image detected by the distortion amount detection section 140 becomes S (distortion amount).

The correction amount calculation section 1310 receiving the distortion amount S calculates "distortion amount/length per unit pixel of drawing resolution=N (quotient)+C (remainder). The drawing resolution means the drawing resolution of the laser exposure device (13Y, 13M, 13C, 13K).

The correction amount calculation section 1310 outputs N (quotient) of N (quotient) and C (remainder) of the calculation result to the rough correction processing section 1340 as the first correction amount and outputs C (remainder) to the fine correction processing section 1360 as the second correction amount.

In this connection, the second correction amount (C (remainder)) is a smaller value as compared with the first correction amount (N (quotient)). That is, the first correction amount (N (quotient)) means the number of pixels of unit pixels of the drawing resolution and the second correction amount (C (remainder)) means a subpixel less than one pixel.

The color conversion processing section 1320 converts RGB color space into color space represented, for example, in each color of cyan (C), magenta (M), yellow (Y), and black (K) (which will be hereinafter called "CMYK color" (the color space will be hereinafter called "CMYK color space"). That is, the RGB data as original image data is converted into CMYK data (bit map data) as original image data.

The gradation correction section 1330 makes gradation correction to the original image data (CMYK data) based on data concerning TRC (Tone Reproduction Curve).

The rough correction processing section 1340 has a function of first correction processing means and performs correction processing of correcting a distortion of the output image from the original image for original image data after gradation correction (image before screen processing). The rough correction processing section 1340 performs processing of changing pixel arrangement such as insertion or thinning out (deletion) of a pixel (unit pixel of drawing resolution) into or from the original image or address control in response to the first correction amount (N (quotient)) given from a correction amount calculation section 1370, for example, as the correction processing.

By the way, in the correction processing by inserting or thinning out (deleting) a pixel, if the output image is short in the length in the main scanning direction as compared with the original image, the correction processing by inserting a pixel is performed. On the other hand, if the output image is long in the length in the main scanning direction as compared with the original image, the correction processing by thinning out a pixel is performed.

In the description to follow, the correction processing of the rough correction processing section 1340 is called rough correction processing.

FIG. 5 shows an example of an image (correction image) of the result of correcting a distortion of the dimensions in the main scanning direction of the output image from the original image (which will be hereinafter called "main scanning direction dimension distortion") when the output image is short in the length in the main scanning direction as compared with the original image.

Figure 5A:
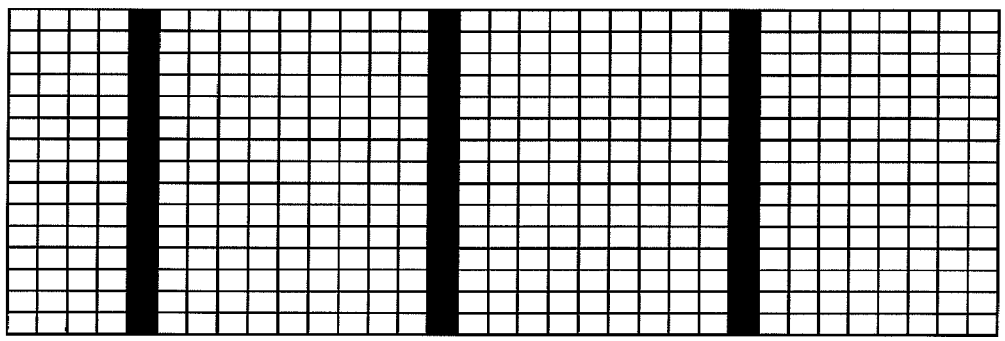
FIGS. 5A and 5B are drawings to show examples of correction images of the correction result of dimension distortion in the main scanning direction according to the first embodiment of the invention.

FIG. 5A shows a correction image when each pixel is inserted into the same position in the main scanning direction of a plurality of lines (scanning lines) for the original image. That is, for the correction image, a pixel is inserted into the same position in the main scanning direction in a plurality of lines for the original image and pixels are inserted into the same positions different in the main scanning direction in a plurality of lines (in the example, three pixels on one line).

Figure 5B:
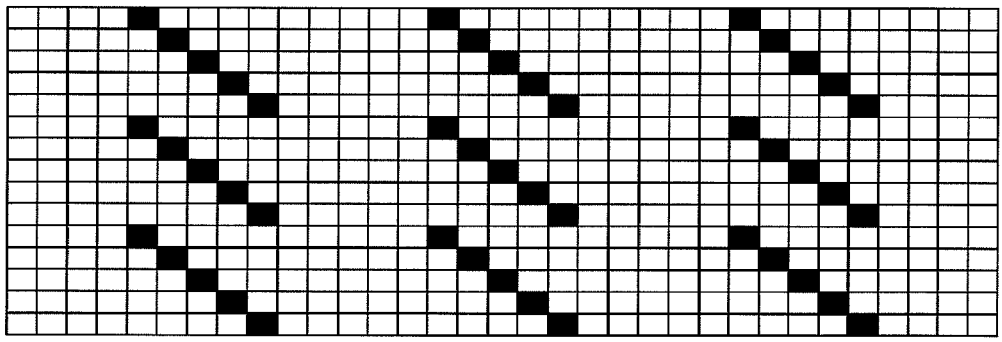

FIG. 5B show a correction image when each pixel is inserted into offset positions in the main scanning direction in a plurality of lines for the original image. That is, for the correction image, a pixel is inserted into the offset position in the main scanning direction in each line (position offset in the main scanning direction one pixel relative to the preceding line insertion position) with a plurality of lines (in the example, five lines) as a period, and pixels are inserted into the different positions in the main scanning direction in a plurality of lines (in the example, three pixels on one line).

In this connection, in both the example shown in FIG. 5A and the example shown in FIG. 5B, the correction image is provided by expanding the original image three pixels in the main scanning direction.

Referring again to FIG. 3, screen processing section 1350 serves a function of screen processing means and executes screen processing (dot generation processing) for image data (image to be processed) after subjected to the rough correction processing.

The fine correction processing section 1360 has a function of second correction processing means and performs correction processing of correcting a distortion of the output image from the original image for the image data after subjected to screen processing (image after subjected to screen processing). As the correction processing, for example, the fine correction processing section 1360 changes pixel arrangement such as inserting or thinning out (deleting) a pixel into or from the image after subjected to screen processing (the image after subjected to screen processing) or address control or changes an exposure pulse signal corresponding to the image after subjected to screen processing, namely, a pulse width modulation signal (PWM signal) or a pulse strength modulation signal (PAM signal) in response to the second correction amount (C (remainder)) given from the correction amount calculation section 1310.

By the way, in the correction processing by inserting or thinning out (deleting) a pixel, if the output image is short in the length in the main scanning direction as compared with the original image, the correction processing by inserting a pixel is performed. On the other hand, if the output image is long in the length in the main scanning direction as compared with the original image, the correction processing by thinning out a pixel is performed.

The fine correction processing section 1360 performs binary or multivalued correction processing.

In the description to follow, the correction processing of the fine correction processing section 1360 is called fine correction processing.

In the first embodiment, the rough correction processing section 1340 and the fine correction processing section 1360 serve the function of correction processing means for performing correction processing of correcting the distortion for the image before the screen processing and the image after the screen processing based on the amount of the distortion of the output image from the original image, namely, the correction amounts given from the correction amount calculation section 1310 (first correction amount and second correction amount).

In the first embodiment, the correction processing of correcting a distortion of the output image from the original image by the correction processing means is called distortion correction processing. This distortion correction processing contained the above-described rough correction processing and the above-described fine correction processing.

Next, the distortion correction processing of the image forming device (correction processing of correcting a distortion of an output image from an original image) will be discussed with reference to FIGS. 6 to 10.

As prerequisites, the drawing resolution of each of the laser exposure devices 13Y, 13M, 13C, and 13K of the image output device 3 is 1200 dpi and the image resolution of the original image is also 1200 dpi. Rough correction processing of the rough correction processing section 1340 is processing of changing pixel arrangement by inserting or thinning out (deleting) a pixel. Further, the fine correction processing of the fine correction processing section 1360 is processing of changing an exposure pulse signal, namely, a pulse width modulation signal (PWM signal) or a pulse strength modulation signal (PAM signal).

In the image processing device 2, the drawing processing section 120 expands vector data (image data) contained in PDL data to RGB rasterize data (raster image or bit map data). The RGB rasterize data (original image) is given to the image processing section 130 and color conversion processing is performed by the color conversion processing section 1320 and further a gradation correction is made by the gradation correction section 1330 and then the data is given to the rough correction processing section 1340.

Figure 6:
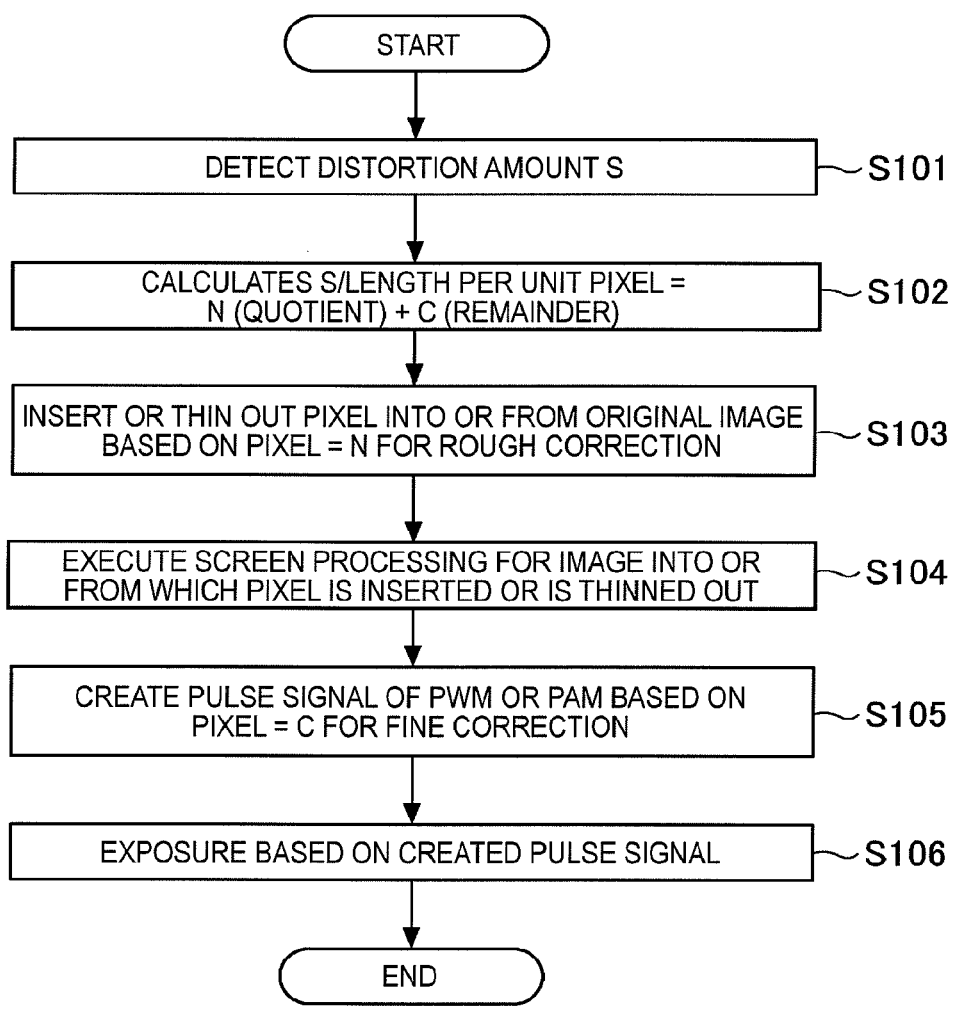
FIG. 6 is a flowchart to show a processing procedure of distortion correction processing according to the first embodiment of the invention.

In the image processing device 2, as shown in FIG. 6, if the distortion amount detection section 140 detects a distortion of the output image from the original image as described above (step S101), it outputs the distortion amount S to the correction amount calculation section 1310 of the image processing section 130.

The correction amount calculation section 1310 calculates "distortion amount S (length)/length per unit pixel of drawing resolution=N (quotient)+C (remainder)" based on the distortion amount given from the distortion amount detection section 140 (step S102), outputs the N (quotient) to the rough correction processing section 1340 as the first correction amount (rough correction amount), and outputs the C (remainder) to the fine correction processing section 1360 as the second correction amount (fine correction amount).

As the calculation result, it is assumed that N (quotient) =five pixels and C (remainder)=10.5 μm. When the drawing resolution is 1200 dpi, the length per unit pixel is about 21 μm (=1 inch/1200) and therefore 10.5 μm corresponds to a ½ pixel.

It is assumed that the distortion amount S is a main scanning direction dimension distortion when the output image is short in the length in the main scanning direction as compared with the original image.

The rough correction processing section 1340 adopts the received first correction amount (N (quotient)) as "pixel for rough correction=N and inserts or thins out (deletes) a pixel into or from the original image (RGB rasterize data) received from the gradation correction section 1330 (executes rough correction processing) based on the N (step S103).

Figure 7A:
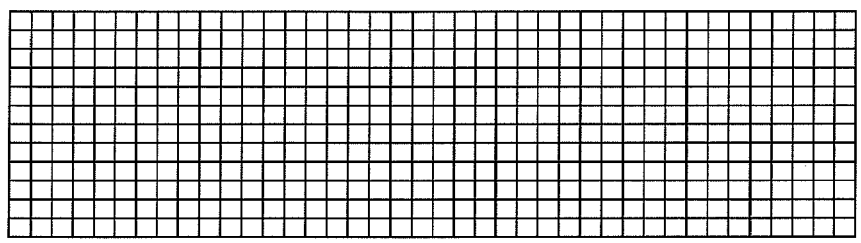
Figure 7B:
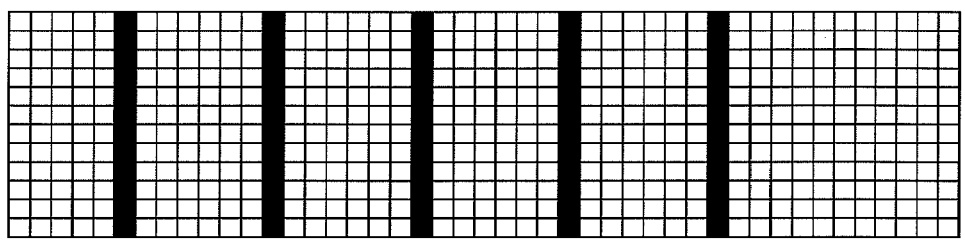

FIG. 7B shows an example of an image after rough correction processing by inserting pixels into an original image shown in FIG. 7A based on N (quotient)=five pixels calculated based on the distortion amount S of the main scanning direction dimension distortion when the output image is short in the length in the main scanning direction as compared with the original image. The insertion method of pixels in the example shown in FIG. 7B is similar to the insertion method of pixels in the example shown in FIG. 5A.

Figure 8A:
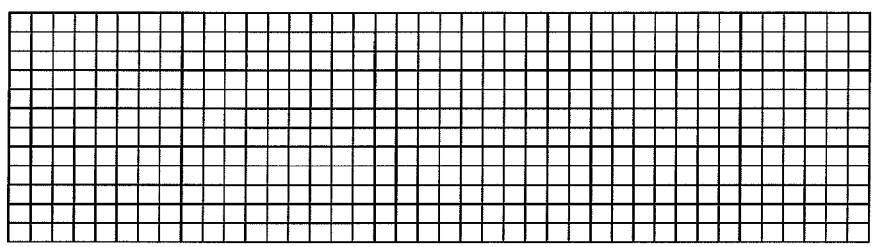
FIGS. 8A and 8B are drawings to describe the processing process of the distortion correction processing (rough correction processing) according to the first embodiment of the invention.
Figure 8B:
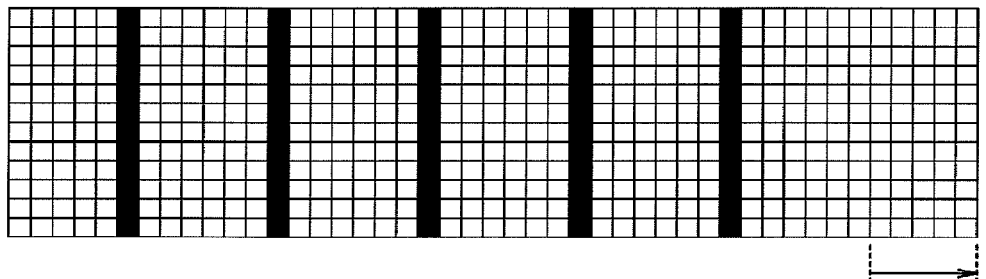

Referring to FIGS. 7A and 7B and FIGS. 8A and 8B, the image after subjected to rough correction processing shown in FIG. 8B (see FIG. 7B) becomes an image resulting from expanding the original image shown in FIG. 8A (see FIG. 7A) five pixels in the main scanning direction.

Next, the screen processing section 1350 executes screen processing for the image after subjected to the rough correction processing (pixel insertion or thinning out) as described above (in the example, image after subjected to the rough correction processing by pixel insertion) (step S104).

Figure 7C:
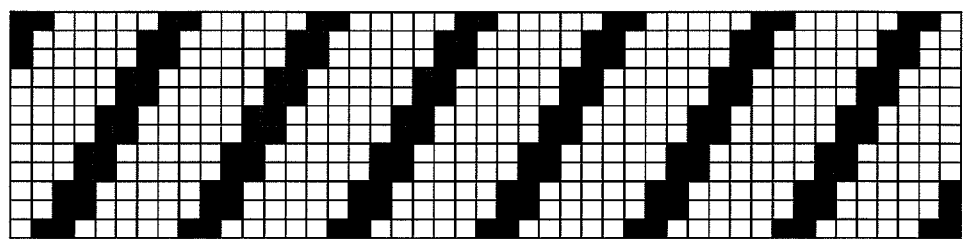

FIG. 7C shows an example of an image after the screen processing is executed for the image after the rough correction processing shown in FIG. 7B.

The fine correction processing section 1360 adopts the received second correction amount (C (remainder)) as "pixel for fine adjustment=C" and creates an exposure pulse signal (PWM signal or PAM signal) corresponding to the image after subjected to the screen processing based on the C (½ pixel) (step S105).

Creation of the pulse signal, namely, an outline of the fine correction processing will be discussed. The fine correction processing section 1360 determines insertion positions of pixel for fine adjustment (subpixel) in the image shown in FIG. 7C (image after the screen processing). FIG. 7D shows an example of the determined insertion positions. Next, the fine correction processing section 1360 creates a pulse signal to insert the pixel (subpixel) based on the value "C (remainder)" into the determined insertion positions.

The pulse signal thus created (PWM signal or PAM signal) is output to the image output device 3 as a video signal.

The fine correction processing section 1360 outputs the created pulse signal (video signal) to the image output device 3, which then exposes based on the received pulse signal (step S106). That is, in the image output device 3, the image forming section 220 exposes based on the pulse signal under the control of the image forming section 210.

FIG. 7E shows an exposure state (drawing result) in which the image forming unit of the image forming section 220 exposes based on the pulse signal.

Next, the fine correction processing of the fine correction processing section 1360 will be discussed in detail.

Figure 9A:
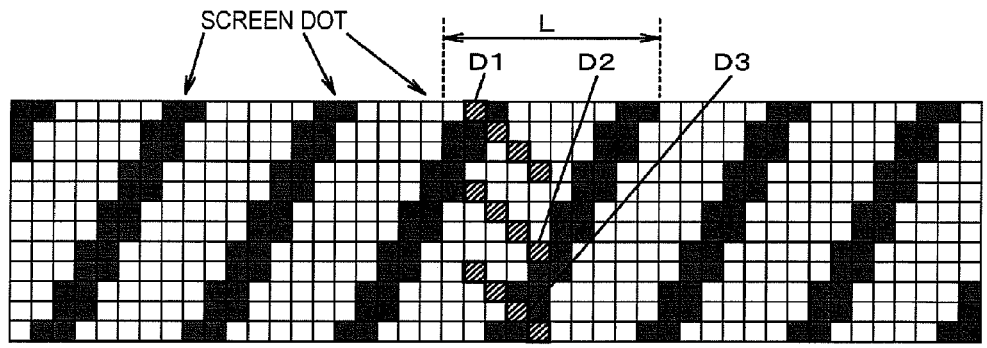
FIGS. 9A and 9B are drawings to describe the processing process of the distortion correction processing (fine correction processing) according to the first embodiment of the invention.
Figure 9B:
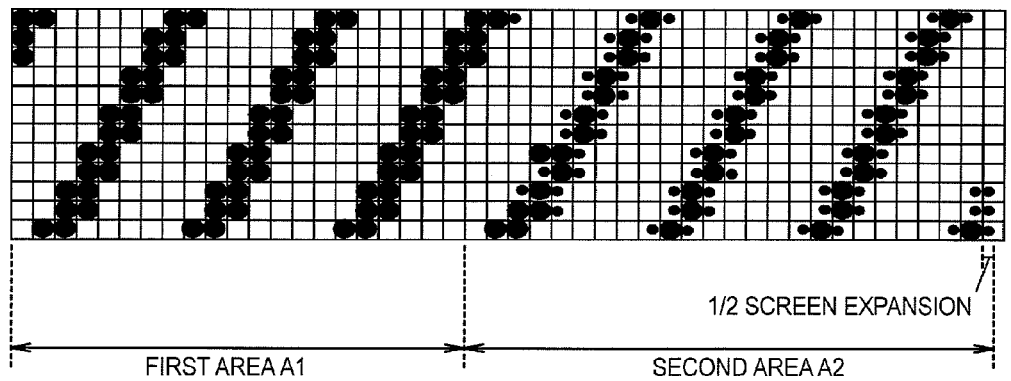

Here, description is given with reference to FIGS. 9A and 9B to show the same matter as shown in FIGS. 7D and 7E.

To begin with, the fine correction processing section 1360 determines insertion positions to insert a subpixel less than one pixel based on the second correction amount (fine correction amount), namely, C (remainder)=½ pixel. FIG. 9A shows an example of the determined insertion positions (see FIG. 7D).

In the insertion positions in the example shown in FIG. 9A, the insertion positions indicated by D1, D2, and D3 are black positions of screen dots and other insertion positions are positions of white pixels (see FIG. 7D).

The fine correction processing section 1360 generates a PWM signal with a pulse width of 100% corresponding to the black pixel in a first area A1 shown in FIG. 9A and generates a PWM signal according to the following rule of fine correction in a second area A2 shown in FIG. 9A:

For fine adjustment relating to the second area A2, fine correction when attention is focused on a portion of a range L in the first line and the second line shown in FIGS. 9A and 9B will be discussed with reference to FIGS. 10A and 10B.

Figure 10A:
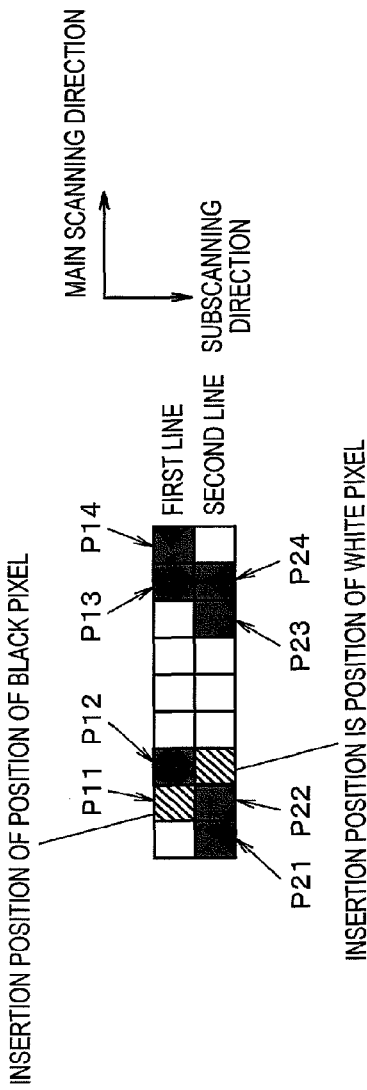
FIGS. 10A and 10B are drawings to describe the processing process of the distortion correction processing (fine correction processing) according to the first embodiment of the invention.

In FIG. 10A, P11 to P14 and P21 to P24 indicate screen dots (black pixels), the black pixel P21 is a pixel in the first area A1, and other black pixels are pixels in the second area.

Figure 10B:
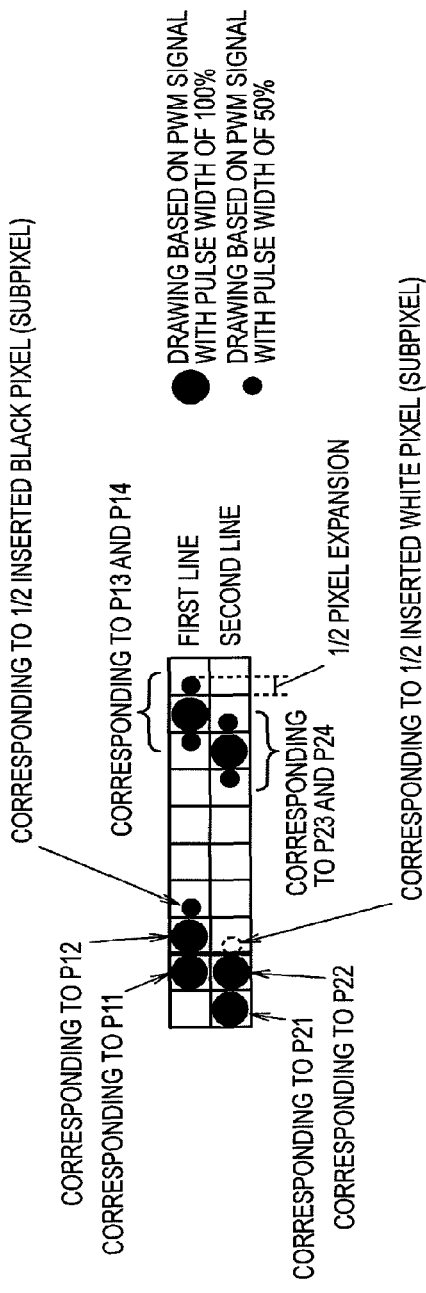

If the insertion position (insertion position on the first line) is the position of the black pixel (pixel P11) as shown in FIG. 10A, the fine correction processing section 1360 creates a PWM signal with a pulse width of 50% to insert ½ black pixel just after the pixel P12 as shown in FIG. 10B.

Then, ½ pixel (subpixel) shift in the main scanning direction occurs on the first line and the two pixels P13 and P14 are also shifted ½ pixel (subpixel) in the main scanning direction.

Thus, the fine correction processing section 1360 creates a PWM signal with a pulse width of 50% corresponding to ½ black pixel, a PWM signal with a pulse width of 100% corresponding to one black pixel, and a PWM signal with a pulse width of 50% corresponding to ½ black pixel corresponding to the two pixels P13 and P14. Moreover, the fine correction processing section 1360 outputs the signals in the order of the PWM signal with a pulse width of 50%, the PWM signal with a pulse width of 100%, and the PWM signal with a pulse width of 50% as shown in FIG. 10B.

On the other hand, if the insertion position (insertion position on the first line) is the position of a white pixel as shown in FIG. 10A, the fine correction processing section 1360 creates a PWM signal with a pulse width of 50% to insert ½ white pixel just after the pixel P22 as shown in FIG. 10B.

Then, ½ pixel (subpixel) shift in the main scanning direction occurs on the second line and the two pixels P23 and P24 are also shifted ½ pixel (subpixel) in the main scanning direction. Pulse signals are created as with the case of the two pixels P13 and P14 described above corresponding to the two pixels P23 and P24 (see FIG. 10B).

When the fine correction processing terminates, the image after the fine correction processing becomes a state in which the image after screen processing is expanded ½ pixel in the main scanning direction concerning the range L of the two lines.

When the fine correction processing as described above is executed for all of the second area A2, the image after the fine correction processing becomes an image resulting from expanding the image after screen processing ½ pixel in the main scanning direction (FIGS. 7C and 7E and FIG. 9B).

To insert or thin out a subpixel less than one pixel, the PWM signal or the PAM signal is used to make multivalued fine correction. That is, if the pixel at the insertion position (or thinning out position) shown in FIG. 7D is a black pixel, a black pixel is also inserted (multivalued exposure, pseudo insertion) and thus the result becomes drawing shown in FIG. 7E.

In the first embodiment, for the rough correction processing (processing of changing pixel arrangement such as pixel insertion or thinning out or address control) of the rough correction processing section 1340, the case where a distortion of the output image from the original image is a dimension distortion in the main scanning direction (main scanning direction magnification balance distortion) is described, but the invention is not limited to it and the following may be performed:

If the distortion of the output image from the original image is a dimension distortion in the subscanning direction (subscanning direction magnification balance distortion) or is a dimension distortion in the main scanning direction and a dimension distortion in the subscanning direction, the rough correction processing section 1340 may perform the rough correction processing.

In the first embodiment, for the fine correction processing (processing of changing pixel arrangement such as pixel insertion or thinning out or address control or processing of changing the exposure pulse signal) of the fine correction processing section 1360, the case where a distortion of the output image from the original image is a dimension distortion in the main scanning direction (main scanning direction magnification balance distortion) is described, but the invention is not limited to it and the following may be performed:

If the distortion of the output image from the original image is a dimension distortion in the subscanning direction (subscanning direction magnification balance distortion) or is a dimension distortion in the main scanning direction and a dimension distortion in the subscanning direction, the fine correction processing section 1360 may perform the fine correction processing.

If the rough correction processing section 1340 and the fine correction processing section 1360 performs correction processing for the dimension distortion in the subscanning direction or the dimension distortion in the main scanning direction and the dimension distortion in the subscanning direction, the distortion amount detection section 140 detects the amount of the dimension distortion in the subscanning direction or the amount of the dimension distortion in the main scanning direction and the amount of the dimension distortion in the subscanning direction, and outputs the detection result to the correction amount calculation section 1310.

In the first embodiment, the rough correction processing section 1340 and the fine correction processing section 1360 may perform the rough correction processing and the fine correction processing described above respectively if a distortion of the output image from the original image is a color distortion (color shift).

That is, if, for example, the pixels of at least two of color components (yellow, magenta, cyan, and black) exist at the same pixel position, the rough correction processing section 1340 and the fine correction processing section 1360 may move a pixel of a color component at a pixel position different from the pixel position to the same correct pixel position by address control, thereby performing processing of changing pixel arrangement (correction processing).

As described above, in the first embodiment, to correct the distortion of the output image from the original image for the image after the screen processing, the image after the screen processing is corrected (finely corrected, namely, corrected based on a subpixel) based on the small correction amount (second correction amount, namely, C (remainder)) in comparison with the correction amount for correcting all distortions (the correction amount based on the distortion amount S, namely, N (quotient) and C (remainder)).

Thus, occurrence of the image quality result caused by interference (phenomenon of occurrence of a white stripe or a black stripe) of the result of the correction processing (fine correction processing) and the screen is suppressed.

That is, interference of the nature of the screen subjected to the screen processing (period and angle) and the nature of the result of the correction processing (fine correction processing), namely, the nature of pixel insertion or thinning out (period and angle) is suppressed. Thus, occurrence of an image quality defect like a stripe (a white stripe or black stripe) is suppressed.

In the first embodiment, if a distortion of the output image from the original image occurs in response to the accuracy of the mechanism (the image formation section of the image output device) and accuracy of the optical scanning system containing the laser exposure device, occurrence of the image quality result caused by interference of the result of the correction processing (fine correction processing) when the stripe is corrected and the screen is suppressed. Thus, it contributes to relaxation of the accuracy of the mechanism and relaxation of the accuracy of the optical scanning direction and the cost is reduced.

Next, an image forming device according to a second embodiment of the invention will be discussed.

The image forming device has a similar configuration to that of the image forming device 1 of the first embodiment shown in FIG. 1, but an image processing section of image processing device 2 is as shown in FIG. 11.

An image processing section 130A shown in FIG. 11 is provided by adding a resolution conversion section 1410 and a resolution reconversion section 1420 to the image processing section 130 of the first embodiment shown in FIG. 3. Functions of correction amount calculation section 1310, rough correction processing section 1340, and fine correction processing section 1360 are changed.

The resolution conversion section 1410 converts the image resolution of an original image to be processed into a higher resolution than that resolution (resolution conversion). The image whose resolution is converted is given to the rough correction processing section 1340. For example, the original image having an image resolution of 600 dpi is converted into an image having a resolution of 1200 dpi. The resolution conversion section 1410 reports the image resolution information of the original image to the resolution reconversion section 1420.

The resolution reconversion section 1420 reconverts the resolution of an image subjected to rough correction processing by the rough correction processing section 1340 to the image resolution reported from the resolution conversion section 1410 (resolution conversion). The image whose resolution is reconverted is given to a screen processing section 1350. For example, an image having a resolution of 1200 dpi is reconverted into an image having a resolution of 600 dpi.

The correction amount calculation section 1310 calculates "distortion amount S (length)/length per unit pixel of resolution after resolution conversion=N (quotient)+C (remainder). That is, in comparison with the first embodiment, "length per unit pixel of drawing resolution" is changed to "length per unit pixel of resolution after resolution conversion."

The correction amount calculation section 1310 and the resolution conversion section 1410 adopt the same predetermined value about the resolution after the resolution conversion described above. Of course, for example, the resolution conversion section 1410 may report the resolution information after the resolution conversion to the correction amount calculation section 1310.

The rough correction processing section 1340 executes rough correction processing in pixel units with the resolution after the resolution conversion, and the fine correction processing section 1360 executes fine correction processing with a subpixel less than one pixel with the reconverted resolution (image conversion). The basic correction processing of the rough correction processing section 1340 and the fine correction processing section 1360 is similar to that of the first embodiment described above.

By the way, the reason why the image resolution of the original image to be processed is converted into a higher resolution than that resolution (resolution conversion) is as follows:

When rough correction is made before screen processing, if the image resolution is not high, for example, like 600 dpi, if correction (rough correction) is simply executed, the following (1) and (2) problems occur:

(1) Since the minimum unit of correction is not small, fine correction is not made. In this connection, if the resolution is 600 dpi, the minimum unit (length per pixel) is about 42 μm (1 inch/600).

(2) Since the minimum unit of correction is not small, it is difficult to uniformly place the correction amount in a plane, locally the correction amount becomes easily large, and the effect on the original image is large.

Then, if an image resolution of 600×600 dpi is converted into a resolution of 1200×1200, for example, the minimum unit of correction becomes small as compared with the case of resolution 600 dpi. That is, when the resolution is 1200 dpi, the minimum unit (length per pixel) is about 21 μm (1 inch/1200).

Rough correction is made in the minimum unit, whereby the (1) and (2) problems described above are improved as compared with the case of resolution 600 dpi.

Resolution conversion such that the image resolution of 600×600 dpi is converted into the resolution of 1200×1200, for example, as described above is executed to solve the (1) and (2) problems described above.

Next, the distortion correction processing of the image forming device (correction processing of correcting a distortion of an output image from an original image) will be discussed with reference to FIGS. 12 to 15.

As prerequisites, the drawing resolution of each of laser exposure devices 13Y, 13M, 13C, and 13K of an image output device 3 is 600 dpi and the image resolution of the original image is also 600 dpi and further the resolution after resolution conversion is 1200 dpi. Rough correction processing of the rough correction processing section 1340 is processing of changing pixel arrangement by inserting or thinning out (deleting) a pixel. Further, the fine correction processing of the fine correction processing section 1360 is processing of changing an exposure pulse signal, namely, a pulse width modulation signal (PWM signal) or a pulse strength modulation signal (PAM signal).

In the image processing device 2, a drawing processing section 120 expands vector data (image data) contained in PDL data to RGB rasterize data (raster image or bit map data). The RGB rasterize data (original image) is given to the image processing section 130 and color conversion processing is performed by a color conversion processing section 1320 and further a gradation correction is made by a gradation correction section 1330 and then the data is given to the resolution conversion section 1410.

Figure 12:
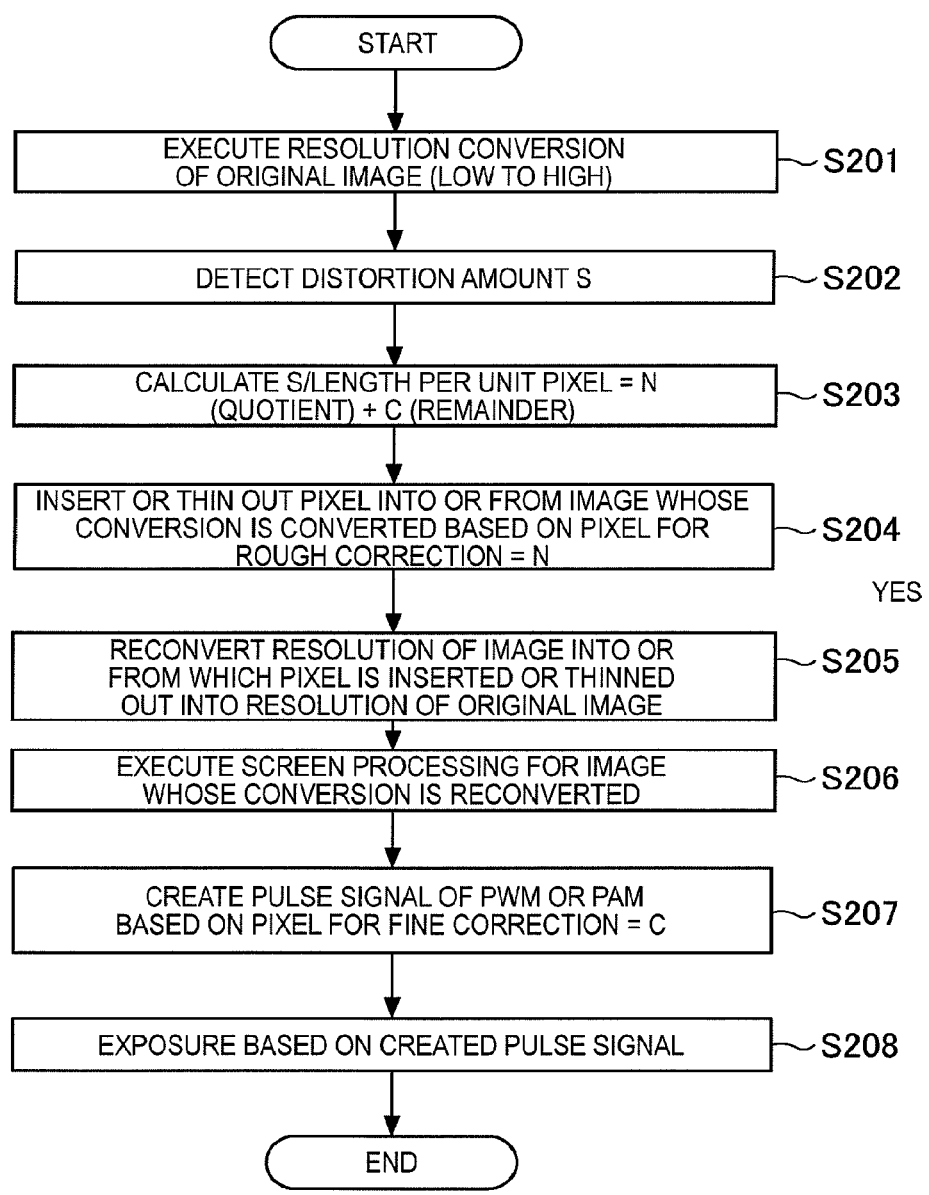
FIG. 12 is a flowchart to show a processing procedure of distortion correction processing according to the second embodiment of the invention.

As shown in FIG. 12, the resolution conversion section 1410 converts the image resolution (in the example, 600 dpi) of the original image from the gradation correction section 1330 into a higher resolution (in the example, 1200 dpi) than that resolution (resolution conversion) (step S201) and outputs the image with the resolution after resolution conversion 1200 dpi to the rough correction processing section 1340. The resolution conversion section 1410 reports image resolution information (in the example, 600 dpi) to the resolution reconversion section 1420.

Figure 13A:
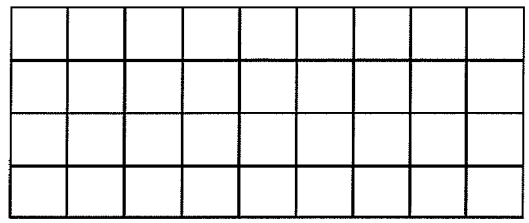
FIGS. 13A to 13F are drawings to describe the distortion correction processing according to the second embodiment of the invention.
Figure 13B:
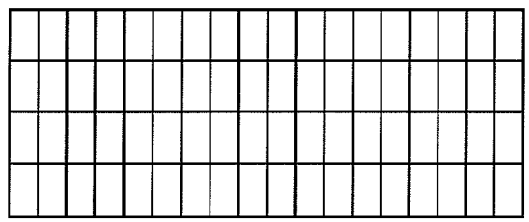

FIG. 13B shows an example of an image after resolution conversion of converting an original image (resolution 600 dpi) shown in FIG. 13A into resolution 1200 dpi.

By the way, in the image processing section 2, if a distortion amount detection section 140 detects a distortion of the output image from the original image (step S202), it outputs distortion amount S to the correction amount calculation section 1310 of the image processing section 130A.

The correction amount calculation section 1310 calculates "distortion amount S (length)/length per unit pixel of resolution after resolution conversion=N (quotient)+C (remainder) based on the distortion amount S given from the distortion amount detection section 140 (step S203), outputs the N (quotient) to the rough correction processing section 1340 as a first correction amount (rough correction amount), and outputs the C (remainder) to the fine correction processing section 1360 as a second correction amount (fine correction amount).

It is assumed that N (quotient)=pixel and C (remainder) =10.5 μm as the calculation result of the correction amount calculation section 1310. When the drawing resolution is 1200 dpi, the length per unit pixel becomes about 21 μm (=1 inch/1200) and thus 10.5 μm corresponds to ½ pixel. In this connection, when the drawing resolution is 600 dpi, the length per unit pixel becomes about 42 μm (=1 inch/600) and thus 10.5 μm corresponds to ¼ pixel.

It is assumed that the distortion amount S is the amount of a main scanning direction dimension distortion when the length of the output image in the main scanning direction is short as compared with the original image.

The rough correction processing section 1340 adopts the received first correction amount (N (quotient)) as "pixel for rough correction=N" and inserts or thins out (deletes) a pixel into or from the received image after the resolution conversion (resolution 1200 dpi) (executes rough correction processing) (step S204).

Figure 13C:
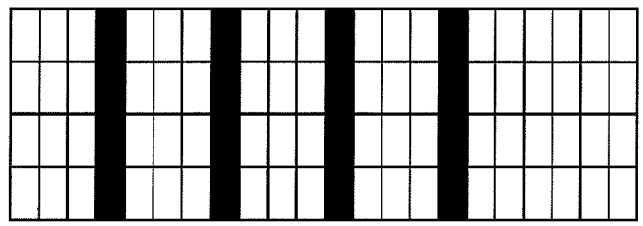

FIG. 13C shows an example of an image after execution of the rough correction processing by inserting pixels into the image (image after the resolution conversion) shown in FIG. 13B based on N (quotient)=four pixels calculated based on the distortion amount S of a main scanning direction dimension distortion when the length of the output image in the main scanning direction is short as compared with the original image. The pixel insertion method in the example shown in FIG. 13C is similar to that in the example shown in FIG. 5A described above.

Figure 14A:
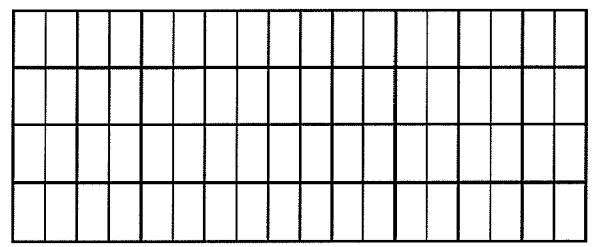
FIGS. 14A and 14B are drawings to describe the processing process of the distortion correction processing (rough correction processing) according to the second embodiment of the invention.
Figure 14B:
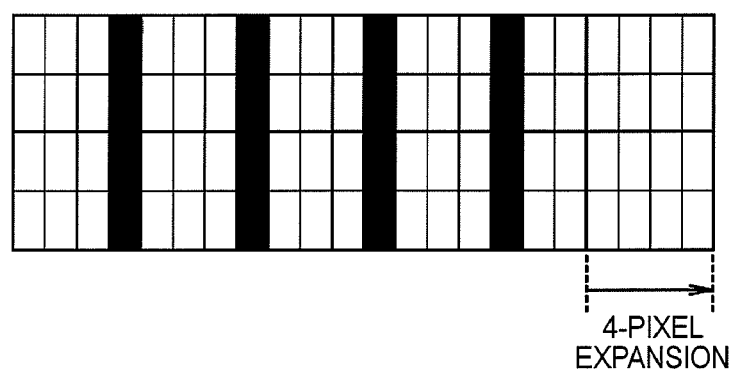

Referring to FIGS. 14A and 14B to show the same matter as shown in FIGS. 13B and 13C, the image after subjected to rough correction processing shown in FIG. 14B (see FIG. 13C) is an image resulting from expanding the image after resolution conversion shown in FIG. 14A (see FIG. 13B) four pixels in the main scanning direction.

Next, the resolution reconversion section 1420 reconverts the resolution of the image subjected to the rough correction processing by the rough correction processing section 1340 (in the example, resolution 1200 dpi) into the image resolution based on the image resolution information reported from the resolution conversion section 1410 (in the example, resolution 600 dpi) (executes resolution conversion) (step S205).

The screen processing section 1350 executes screen processing for the image (resolution 600) after the resolution (1200 dpi) of the image subjected to the rough correction processing (pixel insertion or thinning out) is reconverted (step S206).

Figure 13D:
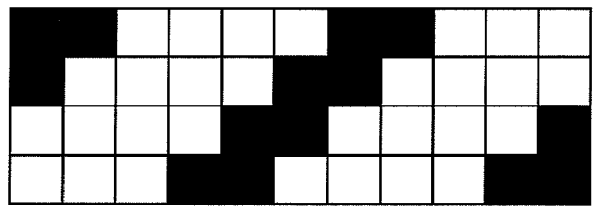

FIG. 13D shows an example of the image (resolution 600 dpi) after the image (resolution 1200 dpi) after subjected to the rough correction processing shown in FIG. 13C is reconverted into the image resolution (600 dpi) and further subjected to the screen processing.

The fine correction processing section 1360 adopts the received second correction amount (C (remainder)) as "pixel for fine correction=C and creates an exposure pulse signal (PWM signal or PAM signal) corresponding to the image (resolution 600 dpi) after subjected to the screen processing based on the C (¼ pixel) (step S207).

Figure 13E:
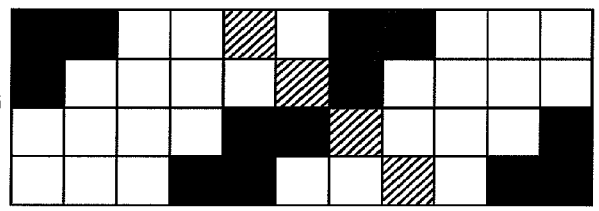

An outline of creation of the pulse signal, namely, fine correction processing will be discussed. The fine correction processing section 1360 determines the insertion position of a pixel (subpixel) for fine adjustment in the image (image after the screen processing) shown in FIG. 13D. FIG. 13E shows an example of the determined insertion positions. Next, the fine correction processing section 1360 creates a pulse signal to insert a pixel (subpixel) based on the value C (remainder)) into the determined insertion positions.

The pulse signal thus created (PWM signal or PAM signal) is output to the image output device 3 as a video signal.

The fine correction processing section 1360 outputs the created pulse signal (video signal) to the image output device 3, which then exposes based on the received pulse signal (step S208). That is, in the image output device 3, an image forming section 220 exposes based on the pulse signal under the control of an image forming section 210.

Figure 13F:
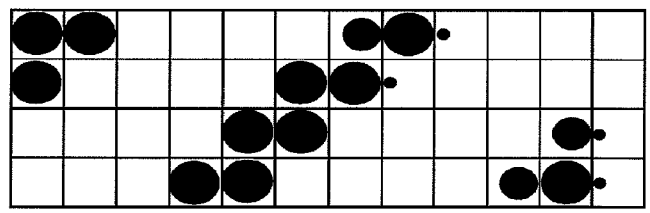

FIG. 13F shows an exposure state (drawing result) in which the image forming unit of the image forming section 220 exposes based on the pulse signal.

That is, when the laser exposure device 13Y, 13M, 13C, 13K having a drawing resolution of 600 dpi exposes, the fine correction processing section 1360 corrects a subpixel less than one pixel of 600 dpi using the PWM signal or the PAM signal so as to provide the drawing result shown in FIG. 13F.

Next, the fine correction processing of the fine correction processing section 1360 will be discussed in detail.

Figure 15A:
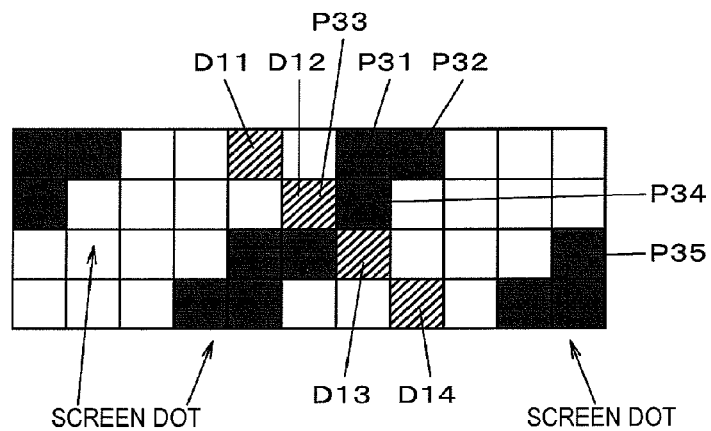
FIGS. 15A and 15B are drawings to describe the processing process of the distortion correction processing (fine correction processing) according to the second embodiment of the invention.
Figure 15B:
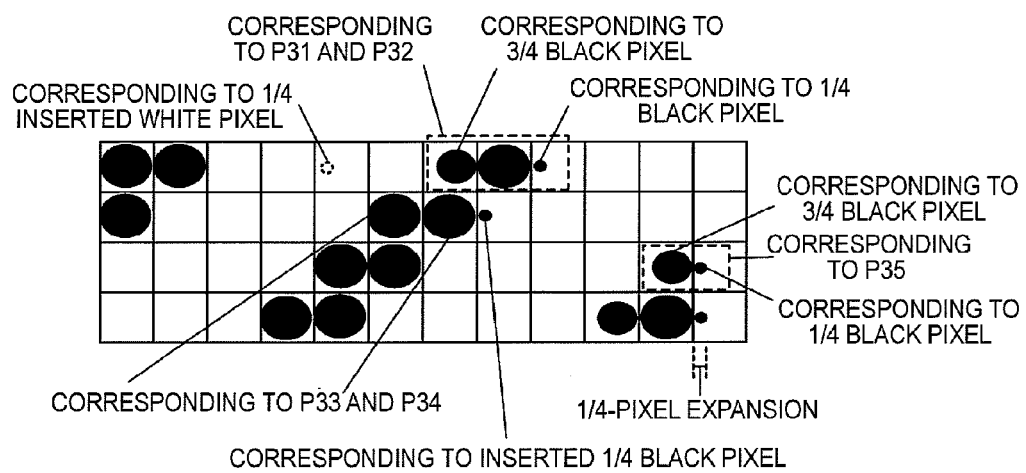

Here, description is given with reference to FIGS. 15A and 15B to show the same matter as shown in FIGS. 13E and 13F.

To begin with, the fine correction processing section 1360 determines insertion positions to insert a subpixel less than one pixel based on the second correction amount (fine correction amount), namely, C (remainder)=¼ pixel. FIG. 15A shows an example of the determined insertion positions (see FIG. 13E).

In the example shown in FIG. 15A, D11, D12, D13, and D14 indicate pixel (subpixel) insertion positions, the insertion position D12 is the position of a black pixel of a screen dot, and other insertion positions D11, D13, and D14 are positions of white pixels (see FIG. 13E).

Since the insertion position D11 on the first line is the position of a white pixel, the fine correction processing section 1360 creates a PWM signal having a pulse width of 25% to insert ¼ white pixel as shown in FIG. 15B.

Then, ¼ pixel (subpixel) shift is made in the main scanning direction on the first line, and two pixels P31 and P32 are also shifted ¼ pixel (subpixel) in the main scanning direction.

Thus, the fine correction processing section 1360 creates a PWM signal with a pulse width of 75% corresponding to ¾ black pixel, a PWM signal with a pulse width of 100% corresponding to one black pixel, and a PWM signal with a pulse width of 25% corresponding to ¼ black pixel corresponding to the two pixels P31 and P32. Moreover, the fine correction processing section 1360 outputs the signals in the order of the PWM signal with a pulse width of 75%, the PWM signal with a pulse width of 100%, and the PWM signal with a pulse width of 25% as shown in FIG. 15B.

On the other hand, since the insertion position D12 on the second line is the position of a black pixel, the fine correction processing section 1360 creates a PWM signal having a pulse width of 25% to insert ¼ black pixel just after two pixels P32 and P33 as shown in FIG. 15B.

Then, ¼ pixel (subpixel) shift is made in the main scanning direction on the first line.

To insert a pixel (subpixel) into insertion positions D13 and D14 on the third line and the fourth line, a pixel (subpixel) is inserted using a PWM signal as with the pixel (subpixel) insertion method described above.

In this connection, a PWM signal having a pulse width of 75% corresponding to ¾ black pixel and a PWM signal having a pulse width of 25% corresponding to ¼ black pixel are created corresponding to pixel P35 on the third line.

When the fine correction processing described above terminates, the image after the fine correction processing becomes an image resulting from expanding the image after the screen processing (resolution 600 dpi) ¼ pixel in the main scanning direction in terms of resolution 600 dpi (see FIGS. 13D and 13F and FIG. 15B).

As described above, in the second embodiment, even with an image forming device, for example, a printer with a low drawing resolution of 600 dpi, rough correction is made in the minimum units of correction with a smaller value as compared with the value before the resolution conversion before the screen processing about the image after resolution conversion of the original image. Consequently, the (1) and (2) problems described above are solved.

Next, an image forming device according to a third embodiment of the invention will be discussed.

The image forming device has a similar function configuration to that of the image forming device 1 of the first embodiment. An image processing section of an image processing device forming the image forming device also has a similar configuration to that of the image processing section 130 of the first embodiment shown in FIG. 3.

In the third embodiment, a fine correction processing section 1360 of an image processing device 2 sets a second correction amount (C (remainder)) given from a correction amount calculation section 1310 as one pixel and performs fine correction processing in one-pixel units.

That is, in the first embodiment and the second embodiment, fine correction processing is performed using a subpixel less than one pixel based on the value "C (remainder); while, in the third embodiment, a subpixel less than one pixel is adopted as one pixel and the fine correction processing is performed in one-pixel units.

In other words, the fine correction processing section 1360 defines the second correction amount (C (remainder)) given from the correction amount calculation section 1310 as one pixel and performs processing of changing pixel arrangement of inserting or thinning out (deleting) a pixel into or from the image after screen processing in one-pixel units.

Next, distortion correction processing (correction processing of correcting a distortion of an output image from an original image) of the image forming device will be discussed.

The correction processing basically is similar to the distortion correction processing (correction processing procedure) of the first embodiment shown in FIG. 6, but step 105 of the distortion correction processing differs.

As prerequisites, the drawing resolution of each of laser exposure devices 13Y, 13M, 13C, and 13K of an image output device 3 is 1200 dpi and the image resolution of the original image is also 1200 dpi. Rough correction processing of a rough correction processing section 1340 is processing of changing pixel arrangement by inserting or thinning out (deleting) a pixel. Further, the fine correction processing of the fine correction processing section 1360 is processing of changing pixel arrangement by inserting or thinning out (deleting) a pixel.

First, it is assumed that the processing at steps S101 to S104 shown in FIG. 6 terminates (termination to screen processing of screen processing section 1350 in processing involved in image processing section 130).

Figure 16A:
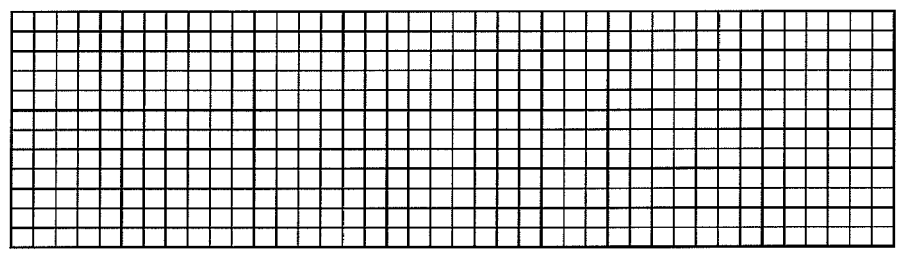
FIGS. 16A to 16E are drawings to describe distortion correction processing of an image processing device according to a third embodiment of the invention.
Figure 16B:
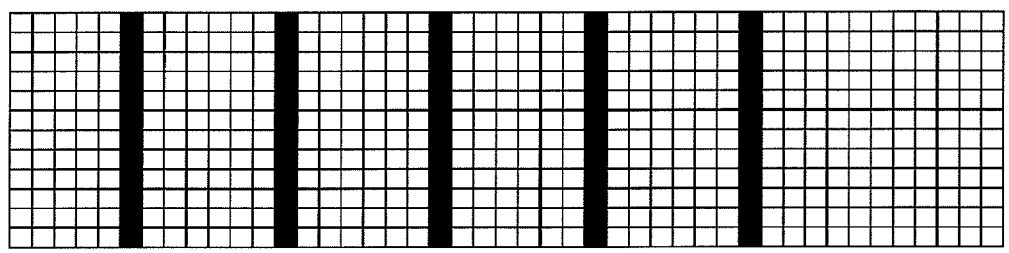
Figure 16C:
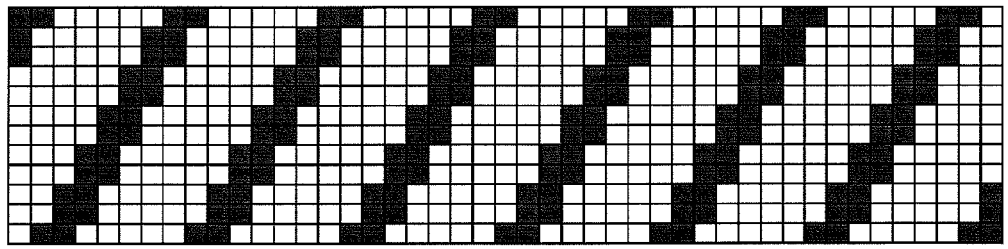

FIGS. 16A, 16B, and 16C show a state of the termination to the screen processing. FIG. 16A shows an example of an original image and is the same as the matter shown in FIG. 7A. FIG. 16B shows an example of an image after the rough correction processing of the rough correction processing section 1340 is performed, and is the same as the matter shown in FIG. 7B. FIG. 16C shows an example of an image after the screen processing of the screen processing section 1350 is performed, and is the same as the matter shown in FIG. 7C.

The fine correction processing section 1360 adopts the second correction amount (C (remainder)) given from the correction amount calculation section 1310, for example, 10.5 μm or ½ pixel as "pixel for fine correction=one pixel" and creates an exposure pulse signal (PWM signal or PAM signal) corresponding to the image after subjected to the screen processing (step S105).

Figure 16D:
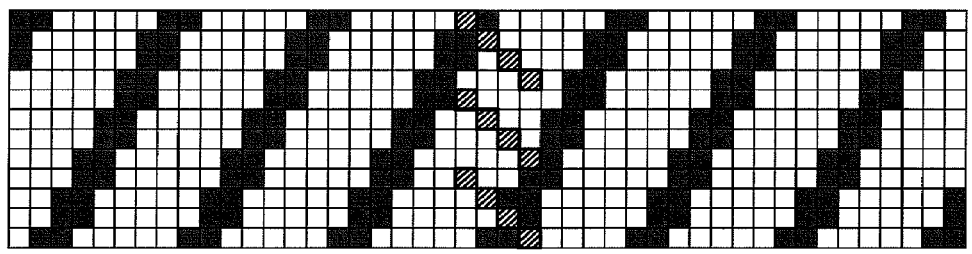

To create the pulse signal, the fine correction processing section 1360 determines the insertion position of one pixel to make fine correction in the image shown in FIG. 16C (image after the screen processing). FIG. 16D shows an example of the determined insertion position. FIG. 16D is the same as FIG. 7D (the matter containing the insertion positions).

Next, the fine correction processing section 1360 creates a pulse signal with a pulse width of 100% to insert one pixel into the determined insertion position.

In this case, if the insertion position is the position of a black pixel, a pulse signal with a pulse width of 100% is created to insert a black pixel; on the other hand, if the insertion position is the position of a white pixel, a pulse signal with a pulse width of 100% is created to insert a white pixel.

The fine correction processing section 1360 outputs the created pulse signal (video signal) to the image output device 3, which then exposes based on the received pulse signal (step S106). That is, in the image output device 3, an image forming section 220 exposes based on the pulse signal under the control of an image forming section 210.

Figure 16E:
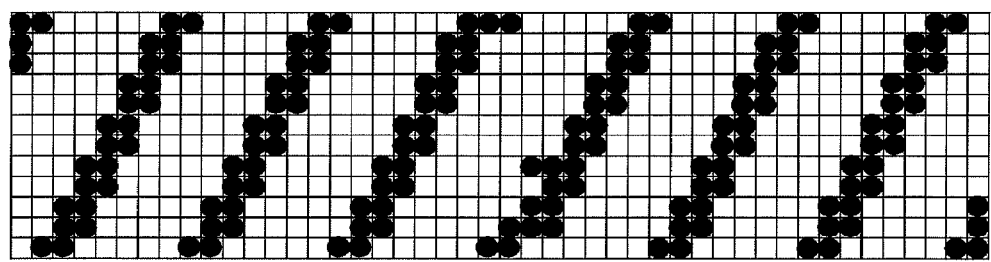

FIG. 16E shows an exposure state (drawing result) in which the image forming unit of the image forming section 220 exposes based on the pulse signal.

In this connection, the white or black pixel is inserted into the insertion position, whereby each line is shifted one pixel in the main scanning direction as shown in FIG. 16E. Thus, when the fine correction processing described above terminates, the image after the fine correction processing becomes an image resulting from expanding the image after the screen processing (see FIG. 16C) one pixel in the main scanning direction as shown in FIG. 16E.

Next, an image forming device according to a fourth embodiment of the invention will be discussed.

Figure 17:
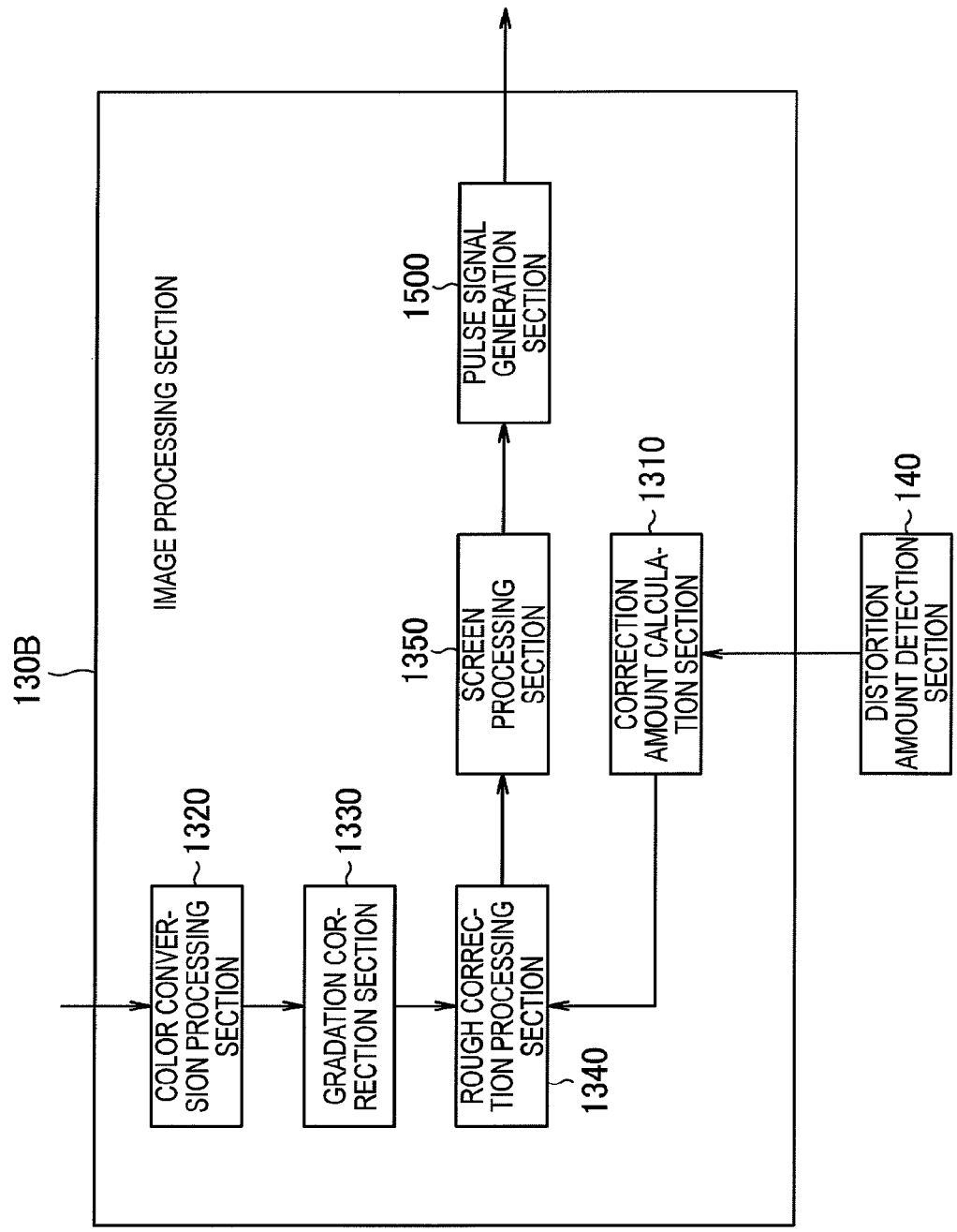
FIG. 17 is a block diagram to show the function configuration of an image processing section of an image processing device according to a fourth embodiment of the invention.

The image forming device has a similar configuration to that of the image forming device 1 of the first embodiment shown in FIG. 1, but an image processing section of an image processing device 2 is as shown in FIG. 17.

An image processing section 130B shown in FIG. 17 has a configuration in which the fine correction processing section 1360 is changed to a pulse signal generation section 1500 in the image processing section 130 of the first embodiment shown in FIG. 3. The function of correction amount calculation section 1310 is changed.

The pulse signal generation section 1500 generates a pulse signal, namely, a pulse width modulation signal (PWM signal) or a pulse strength modulation signal (PAM signal) for an image after screen processing.

In the fourth embodiment, the correction amount calculation section 1310 calculates "distortion amount S (length)/length per unit pixel of drawing resolution=N (quotient)+C (remainder)" and outputs the N (quotient) of the calculation result to a rough correction processing section 1340 as a correction amount (rough correction amount).

In the fourth embodiment, the rough correction processing section 1340 serves a function of correction processing means for performing correction processing of correcting a distortion for the image before screen processing based on the amount of a distortion of an output image from an original image, namely, the correction amount (N (quotient)) given from the correction amount calculation section 1310.

The correction processing of correcting the distortion of the output image from the original image, executed by the correction processing means (rough correction processing section 1340) is called distortion correction processing. This distortion correction processing is the above-mentioned rough correction processing only.

Next, the distortion correction processing of the image forming device (correction processing of correcting the distortion of the output image from the original image) will be discussed with FIGS. 18 and 19.

Figure 18:
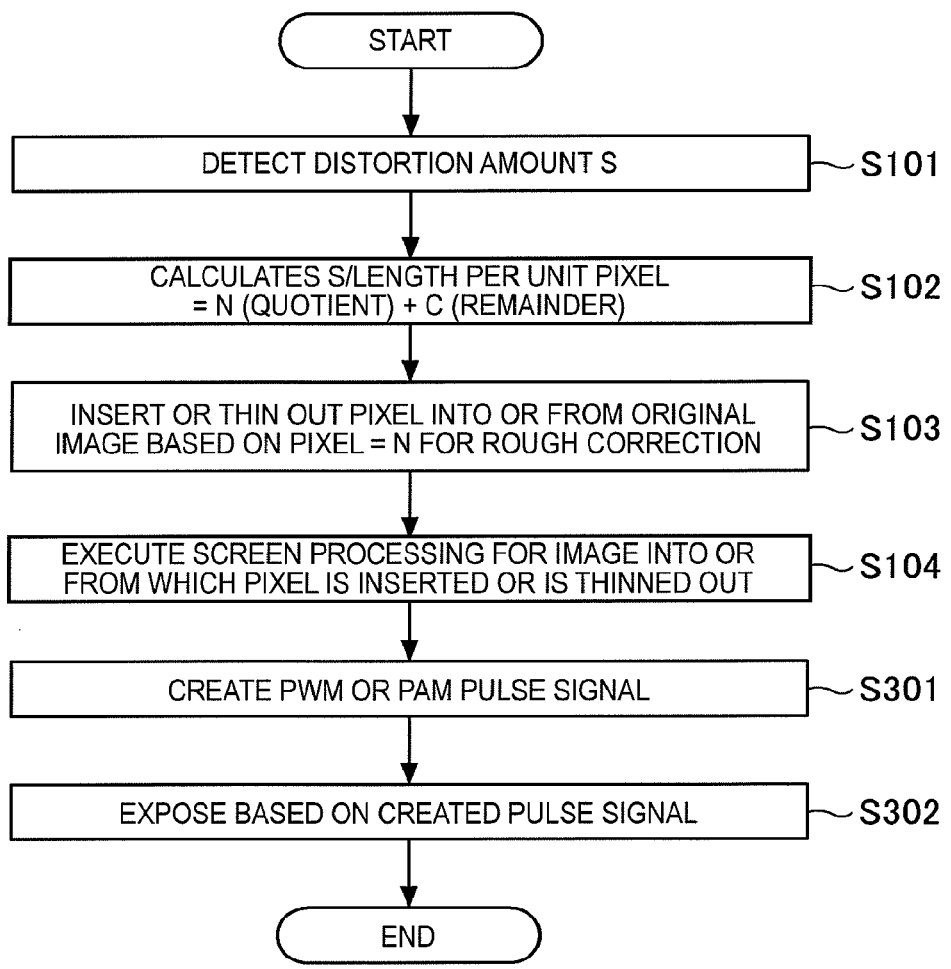
FIG. 18 is a flowchart to show a processing procedure of distortion correction processing according to the fourth embodiment of the invention.

The distortion correction processing shown in FIG. 18 adopts a processing procedure in which steps S105 and S106 in the distortion correction processing shown in FIG. 6 in the first embodiment are changed to steps S301 and S302 respectively.

As prerequisites, the drawing resolution of each of laser exposure devices 13Y, 13M, 13C, and 13K of an image output device 3 is 1200 dpi and the image resolution of the original image is also 1200 dpi. The rough correction processing of the rough correction processing section 1340 is processing of changing pixel arrangement by inserting or thinning out (deleting) a pixel. Further, the pulse signal generation section 1500 generates a pulse width modulation signal (PWM signal).

First, when the image processing device 2 executes processing similar to that at steps S101 to S104 shown in FIG. 6 in the first embodiment as shown in FIG. 18, the pulse signal generation section 1500 generates a pulse width modulation signal (PWM signal) or a pulse strength modulation signal (PAM signal), in the example, a PWM signal having a pulse width of 100% for an image after screen processing (step S301).

Figure 19A:
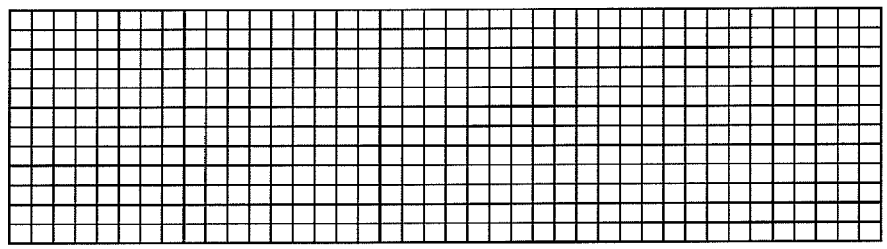
FIGS. 19A to 19D are drawings to describe distortion correction processing according to the fourth embodiment of the invention.
Figure 19B:
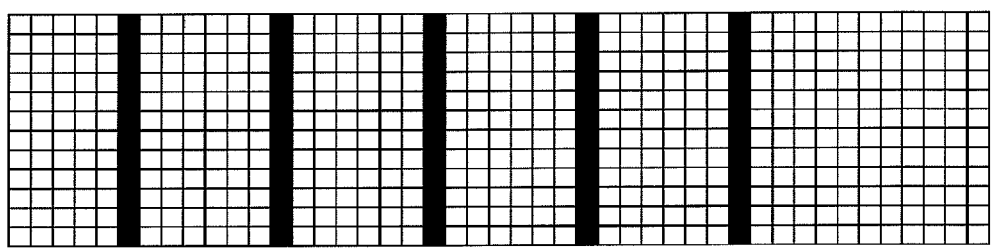
Figure 19C:
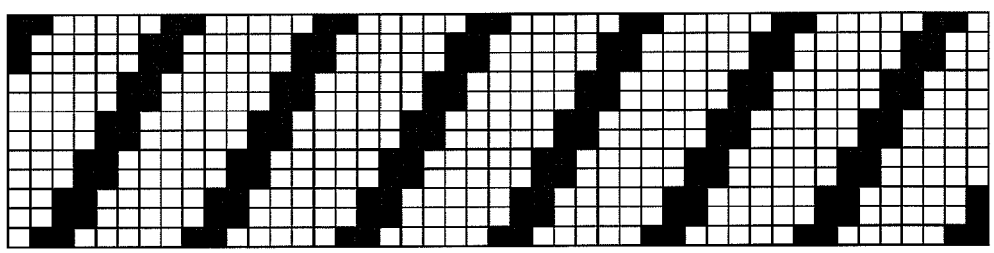

FIGS. 19A, 19B, and 19C show a state of termination to screen processing of a screen processing section 1350 in processing involved in the image processing section 130B. FIG. 19A shows an example of an original image and is the same as the matter shown in FIG. 7A. FIG. 19B shows an example of an image after the rough correction processing of the rough correction processing section 1340 is performed, and is the same as the matter shown in FIG. 7B. FIG. 19C shows an example of an image after the screen processing of the screen processing section 1350 is performed, and is the same as the matter shown in FIG. 7C.

The pulse signal generation section 1500 outputs the generated pulse signal (PWM signal) to the image output device 3, which then exposes based on the received pulse signal (PWM signal)(step S302). That is, in the image output device 3, an image forming section 220 exposes based on the pulse signal under the control of an image forming section 210.

Figure 19D:
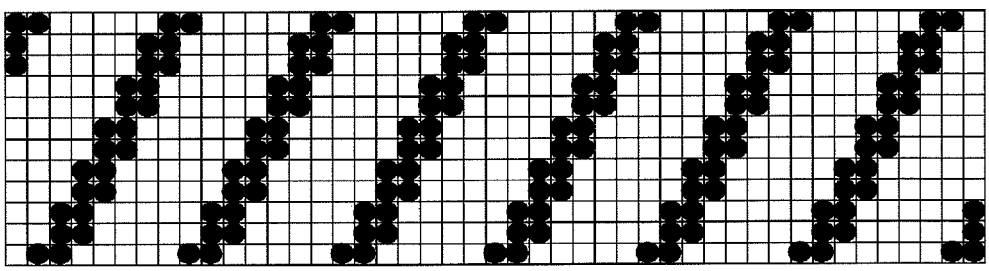

FIG. 19D shows an exposure state (drawing result) in which the image forming unit of the image forming section 220 exposes based on the pulse signal.

By the way, the image forming device of the fourth embodiment is applied to an image forming device having an exposure device having a sufficiently high drawing resolution of 1200 dpi, 2400 dpi, 4800 dpi, etc., (for example, a laser exposure device).

Here, the relationship between each drawing resolution and the length per unit pixel will be discussed. As known, when the resolution is 1200 dpi, the length per unit pixel is about 21 μm; when the resolution is 2400 dpi, the length per unit pixel is about 10.5 μm; and when the resolution is 4800 dpi, the length per unit pixel is about 5.25 μm.

If N (quotient) is a value of an integral multiple of the length per unit pixel of drawing resolution and C (remainder) is a value of 0, the distortion of the output image from the original image is corrected by only distortion correction processing (rough correction processing) of the rough correction processing section 1340.

As described in the example in the first embodiment, if the image resolution is 1200 dpi and the drawing resolution is 1200 dpi, when the calculation result of the correction amount calculation section 1310 is N (quotient)=five pixels and C (remainder)=10.5 μm (½ is a prime), distortion amount S is 115.5 μm.

If the image resolution is 2400 dpi and the drawing resolution is 2400 dpi, the calculation result of the correction amount calculation section 1310 based on the distortion amount S=115.5 μm is N (quotient)=11 pixels and C (remainder)=0.

In this case, the rough correction processing section 1340 may perform processing of changing pixel arrangement of pixel insertion, thinning out, etc., (in this example, changing pixel arrangement by inserting pixels) about 11 pixels in terms of 2400 dpi. Of course, in this case, correction processing corresponding to the fine correction processing in the first embodiment (correction processing after screen processing) is not required.

In this connection, if the calculation result of the correction amount calculation section 1310 is N (quotient)=a value of an integral multiple of the length per unit pixel of drawing resolution and contains C (remainder), the distortion of the output image from the original image corresponding to the C (remainder) is not corrected.

As an application example of the fourth embodiment, the image processing section 130B may have a configuration in which the fine correction processing section 1360 is changed to the pulse signal generation section 1500 in the image processing section 130A of the second embodiment shown in FIG. 17.

Accordingly, if the drawing resolution is, for example, 2400 dpi or 4800 dpi, even when the image resolution of the original image is 600 dpi or 1200 dpi, resolution conversion is performed as described in the second embodiment and distortion correction processing (rough correction processing) of changing pixel arrangement in terms of 2400 dpi or 4800 dpi is performed for an image having a resolution of 2400 dpi or 4800 dpi before screen processing.

As described above, in the fourth embodiment, distortion correction processing (processing of changing pixel arrangement by inserting or thinning out a pixel) is performed only for the original image before screen processing, so that interference of the correction processing result and screen does not occur. Thus, as interference of the correction processing result and screen does not occur, occurrence of an image quality defect caused by correcting the distortion of the output image from the original image (an image quality defect like a stripe (white stripe or black stripe) is suppressed.

Next, the hardware configuration of the image processing device 2 of the image forming device 1 according to the first to fourth embodiments described above will be discussed with reference to FIG. 20.

Figure 20:
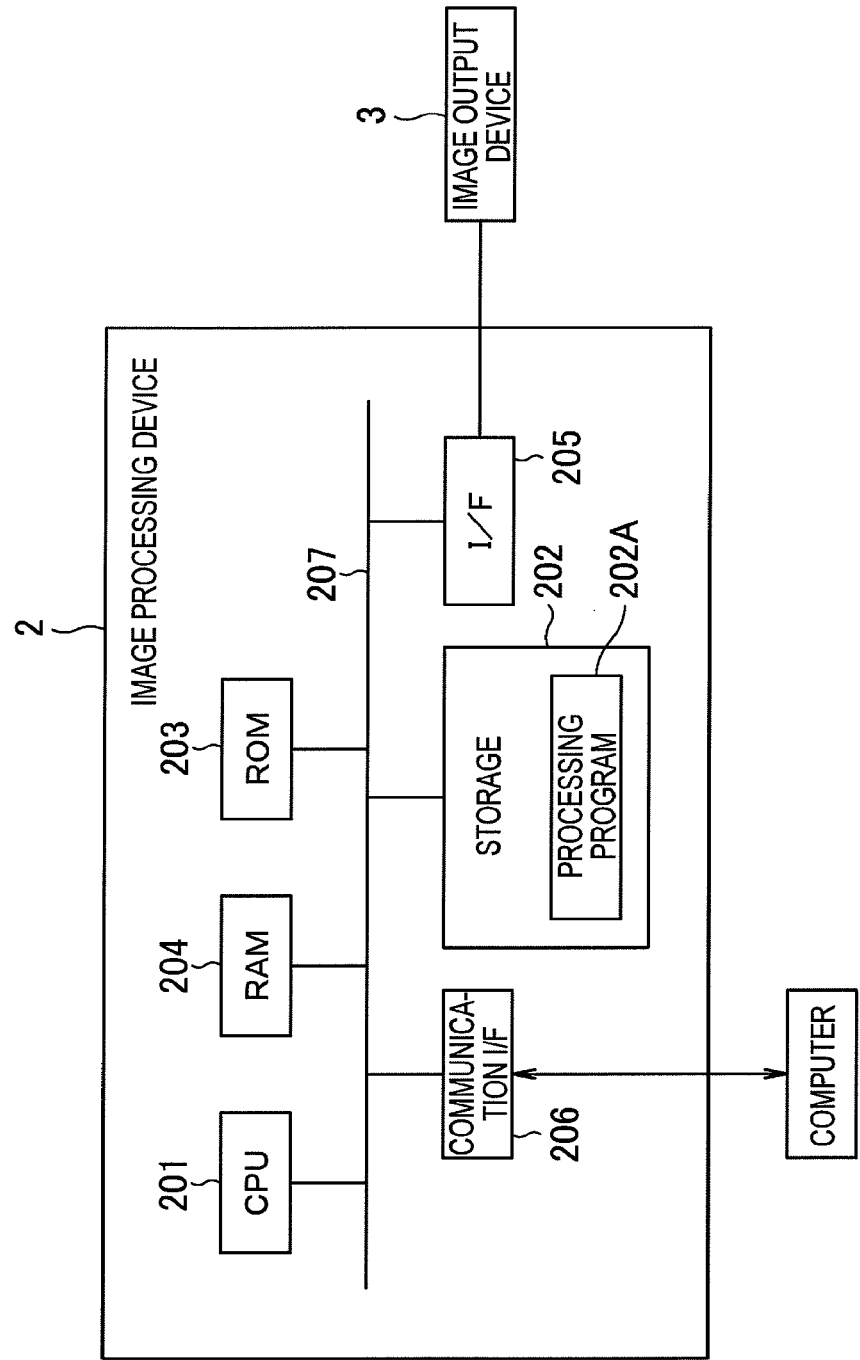
FIG. 20 is a block diagram to show the hardware configuration of the image processing device according to the first to fourth embodiments of the invention.

The image processing device 2 has a CPU 201, storage 202, ROM 203, RAM 204, an I/F 205, and a communication I/F 206 as shown in FIG. 20. The components 201 to 206 are connected to a system bus 207.

The storage 202 is, for example, a hard disk and stores various installed programs such as a processing program 202A and software (programs) for implementing the functions of the PDL interpretation section 110, a drawing processing 120, an image processing section 130, 130A, or 130B, and the distortion amount detection section 140.

The function of the image processing section 130 contains software (program) for realizing the function of the components shown in FIG. 3 applied for realizing those of the first and third embodiments, the function of the image processing section 130A contains software (program) for realizing the function of the components shown in FIG. 11 applied for realizing that of the second embodiment, and further the function of the image processing section 130B contains software (program) for realizing the function of the components shown in FIG. 17 applied for realizing that of the fourth embodiment.

The processing program 202A contains software (program) corresponding to the processing procedure of the distortion correction processing described above (processing procedure shown in FIG. 5, FIG. 12, or FIG. 18).

The software (program) corresponding to the processing procedure of the distortion correction processing described above becomes software (program) corresponding to the processing procedure shown in FIG. 6 (except step S106) for realizing those of the first and third embodiments, the processing procedure shown in FIG. 12 (except step S208) for realizing that of the second embodiment, and the processing procedure shown in FIG. 18 (except step S302) for realizing that of the fourth embodiment.

For example, the processing program 202A at least contains a screen processing step of executing screen processing for an image to be processed and a correction processing step of performing correction processing of correcting a distortion of an output image from an original image for the image before the screen processing and the image after the screen processing based on the amount of the distortion and performing the correction processing by assuming that the correction amount relating to the correction processing for the image after the screen processing is a small value as compared with the correction amount relating to the correction processing for the image before the screen processing.

The screen processing step is executed by the screen processing section 1350 and the correction processing step is executed by the rough correction processing section 1340.

The ROM 203 is read-only memory and stores information required for the image processing section 130, 130A, 130B to execute image processing, communication protocol information for conducting communication with an external device of a computer, etc., and the like.

The RAM is random access memory and stores programs and data containing the processing program 202A read from the storage 202, information read from the ROM 203, the drawing result of the drawing processing section 120, the result of image processing of the image processing section 130, 130A, 130B (color conversion processing, gradation correction processing, screen processing, distortion correction processing, etc.), data transmitted and received through the communication I/F 206, and the like.

The I/F 205 is an interface for communicating with the image output device 3 and, for example, receives the detection result from the sensor 50 (see FIG. 2) in the image output device 3 and outputs the pulse signal (PWM signal) corresponding to image data of an image forming target to the image output device 3.

The communication I/F 206 is an interface for communicating an external device, for example, a computer through a communication line (network, etc.,) and receives image data (PDL data) of an image forming target.

The CPU 201, which is a central processing unit, reads programs containing the processing program 202A from the storage 202 to the RAM 204 and executes the programs, thereby implementing the functions of the PDL interpretation section 110, the drawing processing section 120, the image processing section 130, 130A, or 130B, and the distortion amount detection section 140 described above and implementing the processing function corresponding to the processing program 202A. The CPU 201 controls the whole image processing device 2 (or the whole image forming device 1).

While the invention of the inventors has been specifically described based on the embodiments, it is to be understood that the embodiment disclosed in the Specification are illustrative in all points and that the invention is not limited to the disclosed arts. That is, the technical scope of the invention is not limitedly interpreted based on the description of the embodiments and should be interpreted in accordance with the description of the Claims and equivalent arts to the arts described in the Claims and all changes without departing from the spirit of Claims are contained.

To use programs, they may be provided through a network or may be stored in a storage medium of a CD-ROM, etc., and be provided.

That is, in addition to record of the programs containing the processing program in the storage of a hard disk, etc., the programs may be provided as follows:

For example, the programs may be stored in the ROM and the CPU may load the programs into main memory for execution.

The programs may be stored in a computer-readable storage medium of a DVD-ROM, a CD-ROM, an MO (magnetic optical disk), a flexible disk, etc., and may be distributed.

Further, the image processing device of the image forming device, etc., may be connected to a server or a host computer through a communication line (for example, the Internet) and the programs may be downloaded from the server or the host computer and then may be executed. In this case, the programs can be downloaded into memory of the RAM, etc., or the storage (storage medium) of a hard disk, etc.

In the description given above, the image forming device of the invention is applied to the image forming device for forming a color image, but may be applied to an image forming device for forming a monochrome image.

The image forming device of the invention is applied to the image forming device for recording in toner, but may be applied to an image forming device of ink jet type for recording in ejected ink, for example.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing device comprising:
a screen processing unit that executes screen processing for an image to be processed; and
a calculation unit that receives an amount of a distortion of an output image from an original image;
a correction processing unit that performs correction processing of correcting the distortion of the output image from the original image, based on the amount of the distortion, for (i) the image before the screen processing and (ii) the image after the screen processing, wherein
the correction amount relating to the correction processing for the image after the screen processing is a small value as compared with the correction amount relating to the correction processing for the image before the screen processing, and
the amount of the distortion equals a sum of the correction amount relating to the correction processing for the image before the screen processing and the correction amount relating to the correction processing for the image after the screen processing,
wherein the calculation unit calculates a first correction amount relating to the correction processing for the image before the screen processing and a second correction amount relating to the correction processing for the image after the screen processing,
wherein the correction processing unit includes
a first correction processing unit that performs the correction processing for the original image before the screen processing based on the first correction amount, and
a second correction processing unit that performs the correction processing for the image provided after the screen processing unit executes the screen processing for the image after subjected to the correction processing by the first correction processing unit based on the second correction amount.

2. The image processing device according to claim 1, wherein
the first correction processing unit changes pixel arrangement for the original image as the correction processing, and
the second correction processing unit changes pixel arrangement for the image after subjected to the screen processing or changes an exposure pulse signal corresponding to the image after subjected to the screen processing as the correction processing.

3. An image forming device comprising the image processing device according to claim 1.

4. The image processing device according to claim 1, further comprising:

a conversion unit that converts an image resolution of the original image into a certain resolution prior to the correction processing before the screen processing and reconverts an image resolution of an image subjected to the correction processing before the screen processing into the image resolution of the original image prior to the screen processing.

5. A non-transitory computer-readable medium storing a program that causes a computer to execute image process, the image process comprising:
executing screen processing for an image to be processed;
receiving an amount of a distortion of an output image from an original image performing correction processing of correcting the distortion of the output image from an original image, based on the amount of the distortion, for (i) the image before the screen processing and (ii) the image after the screen processing,
calculating a first correction amount relating to the correction processing for the image before the screen processing and a second correction amount relating to the correction processing for the image after the screen processing,
wherein the correction amount relating to the correction processing for the image after the screen processing is a small value as compared with the correction amount relating to the correction processing for the image before the screen processing,
wherein the amount of the distortion equals a sum of the correction amount relating to the correction processing for the image before the screen processing and the correction amount relating to the correction processing for the image after the screen processing, and
wherein the performing correction processing includes
performing the correction processing for the original image before the screen processing based on the first correction amount, and
performing the correction processing for the image provided after the screen processing unit executes the screen processing for the image after subjected to the correction processing by the first correction processing unit based on the second correction amount.

6. An image processing device comprising:
a screen processing unit that executes screen processing for an image to be processed;
a calculation unit that receives an amount of a distortion of an output image from an original image; and
a correction processing unit that performs correction processing of correcting the distortion of the output image from the original image, based on the amount of the distortion, for (i) the image before the screen processing and (ii) the image after the screen processing, wherein
a correction amount relating to the correction processing for the image after the screen processing is a small value as compared with a correction amount relating to the correction processing for the image before the screen processing,
wherein the correction amount related to the correction processing for the image before the screen processing is based on a quotient value of the amount of the distortion divided by a length per unit pixel, and
wherein the correction amount related to the correction processing for the image after the screen processing is based on a remainder value of the amount of the distortion divided by the length per unit pixel,
wherein the calculation unit calculates a first correction amount relating to the correction processing for the image before the screen processing and a second correction amount relating to the correction processing for the image after the screen processing,
wherein the correction processing unit includes
a first correction processing unit that performs the correction processing for the original image before the screen processing based on the first correction amount, and
a second correction processing unit that performs the correction processing for the image provided after the screen processing unit executes the screen processing for the image after subjected to the correction processing by the first correction processing unit based on the second correction amount.

* * * * *